US010769491B2

(12) United States Patent
Matei et al.

(10) Patent No.: US 10,769,491 B2
(45) Date of Patent: Sep. 8, 2020

(54) MACHINE LEARNING SYSTEM FOR GENERATING CLASSIFICATION DATA AND PART LOCALIZATION DATA FOR OBJECTS DEPICTED IN IMAGES

(71) Applicant: SRI International, Menlo Park, CA (US)

(72) Inventors: Bogdan Calin Mihai Matei, Princeton Junction, NJ (US); Xiyang Dai, Edison, NJ (US); John Benjamin Southall, Philadelphia, PA (US); Nhon Hoc Trinh, Plainsboro, NJ (US); Harpreet Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 82 days.

(21) Appl. No.: 16/120,023

(22) Filed: Aug. 31, 2018

(65) Prior Publication Data

US 2019/0073560 A1 Mar. 7, 2019

Related U.S. Application Data

(60) Provisional application No. 62/553,250, filed on Sep. 1, 2017.

(51) Int. Cl.
*G06K 9/00* (2006.01)
*G06K 9/62* (2006.01)
(Continued)

(52) U.S. Cl.
CPC ......... *G06K 9/623* (2013.01); *G06K 9/00362* (2013.01); *G06K 9/00664* (2013.01);
(Continued)

(58) Field of Classification Search
CPC ............... G06K 9/623; G06K 9/00362; G06K 9/00664; G06K 9/4628; G06K 9/627;
(Continued)

(56) References Cited

U.S. PATENT DOCUMENTS

2017/0032285 A1\* 2/2017 Sharma .................... G06N 3/08
2017/0256068 A1\* 9/2017 Wang ................... G06K 9/6244
(Continued)

FOREIGN PATENT DOCUMENTS

WO WO-2019018063 A1 \* 1/2019 ........... G06K 9/4628

OTHER PUBLICATIONS

Efficient Fine-grained Classification and Part Localization using one compact network , (2017 IEEE International Conference on Computer Vision Workshops), Xiyang Dai; Ben Southall; Nhon Trinh; Bogdan Matei (Year: 2017).\*

(Continued)

*Primary Examiner* — Khai M Nguyen
(74) *Attorney, Agent, or Firm* — Shumaker & Sieffert P.A.

(57) ABSTRACT

Techniques are disclosed for identifying discriminative, fine-grained features of an object in an image. In one example, an input device receives an image. A machine learning system includes a model comprising a first set, a second set, and a third set of filters. The machine learning system applies the first set of filters to the received image to generate an intermediate representation of the received image. The machine learning system applies the second set of filters to the intermediate representation to generate part localization data identifying sub-parts of an object and one or more regions of the image in which the sub-parts are located. The machine learning system applies the third set of filters to the intermediate representation to generate classification data identifying a subordinate category to which the
(Continued)

object belongs. The system uses the part localization and classification data to perform fine-grained classification of the object.

18 Claims, 10 Drawing Sheets

(51) Int. Cl.
   *G06N 20/00* (2019.01)
   *G06N 3/08* (2006.01)
   *G06N 3/04* (2006.01)
   *G06K 9/46* (2006.01)

(52) U.S. Cl.
   CPC ........... *G06K 9/4628* (2013.01); *G06K 9/627* (2013.01); *G06K 9/6271* (2013.01); *G06N 3/0454* (2013.01); *G06N 3/08* (2013.01); *G06N 20/00* (2019.01)

(58) Field of Classification Search
   CPC .... G06K 9/6271; G06N 20/00; G06N 3/0454; G06N 3/08
   See application file for complete search history.

(56) References Cited

U.S. PATENT DOCUMENTS

| | | | | |
|---|---|---|---|---|
| 2018/0137406 | A1* | 5/2018 | Howard | G06N 3/082 |
| 2018/0250826 | A1* | 9/2018 | Jiang | B25J 9/1697 |
| 2019/0205758 | A1* | 7/2019 | Zhu | G06K 9/6256 |
| 2020/0020097 | A1* | 1/2020 | Do | G06K 9/627 |

OTHER PUBLICATIONS

Efficient Fine-grained Classification and Part Localization Using One Compact Network; Xiyang Dai, Ben southall, Nhon Trinh, Bogdan Matei (Year: 2017).*
Berg, T. et al., "POOF: Part-Based One-vs-One Features for Fine-Grained Categorization, Face Verification, and Attribute Estimation," Proc. Conf. Computer Vision and Pattern Recognition (CVPR), Jun. 2013, 8 pgs.
Branson, S. et al., "Bird Species Categorization Using Pose Normalized Deep Convolutional Nets," British Machine Vision Conference (BMVC) Nottingham, Jun. 2014, 14 pgs.
Cafee, "Deep learning framework by BAIR," retrieved from http://caffe.berkeleyvision.org/, May 2, 2019, 1 pg.
Deng, J., et al., Fine-Grained Crowdsourcing for Fine-Grained Recognition, IEEE Conference on Computer Vision and Pattern Recognition (CVPR), Jun. 2013, 8 pgs.
Donahue, J. et al., "DeCAF: A Deep Convolutional Activation Feature for Generic Visual Recognition," International Conference in Machine Learning (ICML), Jun. 2014, 9 pgs.
Fukui, A. et al., "Multimodal Compact Bilinear Pooling for Visual Question Answering and Visual Grounding," CoRR, Sep. 2016, 12 pgs.
Gao, Y. et al., "Compact Bililnear Pooling," IEEE Conference on Computer Vision and Pattern Recognition (CVPR), Apr. 2016, 10 pgs.
Huang, S. et al., "Part-Stacked CNN for Fine-Grained Visual Categorization," IEEE Conference on Computer Vision and Pattern Recognition (CVPR), Jun. 2016, 10 pgs.
Iandola, F. et al., "SqueezeNet: AlexNet-level accuracy with 50x fewer parameters and <1MB model size," CoRR, Feb. 2016, 5 pgs.
Iandola, F. et al., "SqueezeNet: AlexNet-level accuracy with 50x fewer parameters and <0.5MB model size," CoRR, Nov. 2016, 13 pgs.
ImageNet, "Index," retrieved from http://image-net.org/index, 2016, 1 pg. (Applicant points out, in accordance with MPEP 609.04(a), that the year of publication, 2016, is sufficiently earlier than the effective U.S. filing date, so that the particular month of publication is not an issue.).
ImageNet, "About Overview," retrieved from http://image-net.org/about-overview, 2016, 1 pg. (Applicant points out, in accordance with MPEP 609.04(a), that the year of publication, 2016, is sufficiently earlier than the effective U.S. filing date, so that the particular month of publication is not an issue.).
Jia, Y. et al., "Caffe: Convolutional Architecture for Fast Feature Embedding," arXiv preprint, Jun. 2014, 4 pgs.
Krause, J. et al., "3D Object Representations for Fine-Grained Categorization," 4th International IEEE Workshop on 3D Representation and Recognition (3dRR-13), Sydney, Australia, Dec. 2013, 8 pgs.
Krause, J. et al., "Fine-Grained Recognition without Part Annotations," IEEE Conference on Computer Vision and Pattern Recognition (CVPR), Jun. 2015, 10 pgs.
Krause, J. et al., "Learning Features and Parts for Fine-Grained Recognition," International Conference on Pattern Recognition, Stockholm, Sweden, Aug. 2014, 8 pgs.
Krause, J. et al., "The Unreasonable Effectiveness of Noisy Data for Fine-Grained Recognition," CoRR, Oct. 2016, 26 pgs.
Lin, D. et al., "Deep LAC: Deep Localization, Alignment and Classification for Fine-grained Recognition," 2015 IEEE Conference on Computer Vision and Pattern Recognition (CVPR), Jun. 2015, pp. 1666-1674.
Lin, T. et al., "Bilinear CNN Models for Fine-grained Visual Recognition," International Conference on Computer Vision (ICCV), Dec. 2015, 9 pgs.
Liu, X. et al., "Representation Learning Using Multi-Task Deep Neural Networks for Semantic Classification and Information Retrieval," Proceedings of the 2015 Conference of the North American Chapter of the Association for Computational Linguistics: Human Language Technologies, May 2015, 10 pgs.
Pfister, T., "Advancing Human Pose and Gesture Recognition," PhD Thesis, University of Oxford, Apr. 2015, 220 pgs.
Pfister, T., "Deep Convolutional Neural Networks for Efficient Pose Estimation in Gesture Videos," Asian Conference on Computer Vision; 2014, 16 pgs. (Applicant points out, in accordance with MPEP 609.04(a), that the year of publication, 2014, is sufficiently earlier than the effective U.S. filing date, so that the particular month of publication is not an issue.).
Ranjan, R. et al., "HyperFace: A Deep Multi-task Learning Framework for Face Detection, Landmark Localization, Pose Estimation, and Gender Recognition," CoRR, Dec. 2017, 16 pgs.
Razavian, A. et al., "CNN Features off-the-shelf: an Astounding Baseline for Recognition," Proceedings of the 2014 IEEE Conference on Computer Vision and Pattern Recognition Workshops, CVPRW '14, Washington, DC, USA, May 2014, IEEE Computer Society, 8 pgs.
Shih, K. et al., "Part Localization using Multi-Proposal Consensus for Fine-Grained Categorization," British Machine Vision Conference (BMVC), Jul. 2015, 12 pgs.
Simonyan, K. et al., "Very Deep Convolutional Networks for Large-Scale Image Recognition," CoRR, Apr. 2015, 14 pgs.
Toshev, A. et al., "DeepPose: Human Pose Estimation via Deep Neural Networks," 2014 IEEE Conference on Computer Vision and Pattern Recognition, CVPR 2014, Columbus, OH USA, Aug. 2014, 9 pgs.
Tuzel, O. et al., "Region Covariance: A Fast Descriptor for Detection and Classification,", Springer Berlin Heidelberg, Berlin, Heidelberg; May 2006, (Paper ID 367), 13 pgs.
Visual Geometry Group (VGG)-16 network, A 16 layer convolutional neural network, retrieved from https://gist.github.com/ksimonyan/211839e770f7b538e2d8#file-readme-md, 2014, 11 pgs. (Applicant points out, in accordance with MPEP 609.04(a), that the year of publication, 2014, is sufficiently earlier than the effective U.S. filing date, so that the particular month of publication is not an issue.).
Wah, C. et al., "The Caltech-USCD Birds-200-2011 Dataset," Technical Report, Nov. 2011, 8 pgs.

(56) References Cited

OTHER PUBLICATIONS

Wang, J. et al., "Locality-constrained Linear Coding for Image Classification," IEEE Conference on Computer Vision and Pattern Recognition (CVPR), Jun. 2010, 8 pgs.

Wang, Y. et al.;,"Mining Discriminative Triplets of Patches for Fine-Grained Classification," IEEE Conference on Computer Vision and Pattern Recognition (CVPR), May 2016, 10 pgs.

Xie, S. et al., "Hyper-class Augmented and Regularized Deep Learning for Fine-grained Image Classification," 2015 IEEE Conference on Computer Vision and Pattern Recognition (CVPR), Jun. 2015, 10 pgs.

Zhang, N. et al., "Deformable Part Descriptors for Fine-grained Recognition and Attribute Prediction," IEEE International Conference on Computer Vision (ICCV), Dec. 2013, 8 pgs.

Zhang, N. et al., "Part-based R-CNNs for Fine-grained Category Detection," Springer International Publishing, Cham., Jul. 2014, 16 pgs.

Zhang, Z. et al., "Facial Landmark Detection by Deep Multi-task Learning," 13th European Conference on Computer Vision (ECCV), Sep. 2014, 15 pgs.

\* cited by examiner

MACHINE LEARNING SYSTEM FOR GENERATING CLASSIFICATION DATA AND PART LOCALIZATION DATA FOR OBJECTS DEPICTED IN IMAGES

This application claims the benefit of U.S. Provisional Application 62/553,250 by Bogdan Matei et al., entitled "EFFICIENT FINE-GRAINED CLASSIFICATION AND PART LOCALIZATION USING ONE DEEP NETWORK," and filed on Sep. 1, 2017. The entire content of Application No. 62/553,250 is incorporated herein by reference.

GOVERNMENT RIGHTS

This invention was made with government support under contract no. N41756-16-C-4528 awarded by the United States Navy Engineering Logistics Office. The Government has certain rights in this invention.

TECHNICAL FIELD

This disclosure generally relates to machine learning systems, and more specifically, to image processing by machine learning systems.

BACKGROUND

Machine learning systems may be used to process images to generate various data regarding the image. For example, a machine learning system may process an image to identify one or more objects in the image. Some machine learning systems may apply a model generated by a neural network, such as a convolutional neural network, to process the image. Machine learning systems may require a large amount of "training data" to build an accurate model. However, once trained, machine learning systems may be able to perform a wide variety of image-recognition tasks previously thought to be capable only by a human being. For example, machine learning systems may have use in a wide variety of applications, such as security, commercial applications, scientific and zoological research, and industrial applications such as inventory management and quality control.

SUMMARY

In general, the disclosure describes techniques for identifying, using a machine learning system, discriminative, fine-grained features of an object in an image to improve object classification. Fine-grained classification of objects such as vehicles, natural objects and other classes is an important problem in visual recognition. It is a challenging task because small and localized differences between similar-looking objects indicate the specific fine-grained label. At the same time, accurate classification should discount spurious changes in appearance caused by occlusions, partial views and proximity to other clutter objects in scenes. A key contributor to fine-grained recognition are discriminative parts and regions of objects.

Multi-task learning has proven to be effective in several computer vision tasks. Deep networks with end-to-end training are well-suited for multiple tasks because they learn generic representations in early layers prior to specialization in later stages of the network. A well-optimized conventional machine learning system may successfully perform a single specific task with a high degree of accuracy but may perform other types of tasks with much lower rates of accuracy. Thus, conventionally, a model of a machine learning system is trained and optimized to perform one specific task. For example, one model of a machine learning system may process an object identified in an image to perform part localization (e.g., identifying one or more sub-parts of an object within the image and one or more regions of the image within which the one or more sub-parts are located). Another model may process the identified object to perform classification on the identified object (e.g., identify a class of objects to which the identified object belongs).

To perform complex tasks such as fine-grained classification of a recognized object within an image, a machine learning system may need to perform multiple discrete tasks, such as part localization and object classification. Conventional systems may attach multiple shallow and task-specific output layers to a final, fully-connected layer, and train the network to minimize combined losses for each task output. For example, to solve the problems of classification and part localization, conventional systems have used separate machine learning systems for each task and then combined the data generated for each task to perform fine-grained classification of an object. Requiring separate machine learning system models, each requiring independent training, optimization, and computing resources, is cumbersome, resulting in complex models and ad-hoc algorithms, and suffers from low performance in accuracy and processing time. For example, a conventional system that implements a convolutional neural network comprising a plurality of convolutional layers may, for example, change the last fully connected layers dedicated to specific tasks, without performing learning by any low or mid-level representations that may influence the accuracy of multiple, distinct tasks. These problems have prevented the widespread adoption of machine learning systems on computing systems with low or restricted resources, such as mobile devices.

In accordance with the techniques of the disclosure, a system for identifying discriminative, fine-grained features of an object in an image is disclosed. Such a system may jointly optimize both localization of parts and fine-grained class labels by learning from training data. In one example, the system includes multiple sub-networks that share filters of a convolutional neural network, yet have dedicated convolutional layers to capture finer level class specific information. In one example, the system includes an input device configured to receive an image of an object. The system further includes a computation engine comprising processing circuitry for executing a machine learning system. The machine learning system includes a model comprising a first set of filters, a second set of filters, and a third set of filters. In one example, the model is a convolutional neural network model. The machine learning system applies the first set of filters to the received image to generate an intermediate representation of the received image suitable as an input to both the second set of filters and third set of filters. The machine learning system applies the second set of filters to the intermediate representation of the received image to generate part localization data for the object, wherein the part localization data for the object comprises data identifying one or more sub-parts of the object and one or more regions of the received image in which the one or more sub-parts of the object are located. The machine learning system applies the third set of filters to the intermediate representation of the received image to generate the classification data for the object, wherein the classification data for the object comprises data identifying a subordinate category within a basic level category to which the object belongs. The system further includes an output device configured to output part localization data for the object and classification data for the object. Such a system may use the part localization data for the object and classification data for the object to uniquely distinguish the object from other similar objects in a subordinate category of similar objects so as to efficiently perform fine-grained classification of the object.

A system as disclosed herein differs from conventional, multi-task systems in that the system as described herein uses common low- and mid-level representation layers for multiple upper-level tasks. Further, the system as disclosed herein implements a novel analysis for selecting low- and mid-level convolutional layers that are suitable for sharing between the upper-level tasks. Additionally, the system as disclosed herein may use task-specific, deep sub-networks to capture task-specific representations of an image. By performing end-to-end training of each of the convolutional layers for the multiple tasks, the techniques of the disclosure may allow for task-specific tuning of the task-specific representations, while the shared representations are jointly influenced by the needs of both tasks. Such an architecture therefore may enable a machine learning system to perform joint learning of part localization and fine-grained classification tasks effectively and efficiently.

Accordingly, a system as disclosed herein may be capable of capturing and accounting for differences between similar looking objects within the same class to recognize specific instances of the object. Further, such a system may be robust to changes caused by occlusions and overlap with surrounding objects. Additionally, such a system as disclosed herein may be more efficient, faster, and use less computational resources than conventional systems that perform fine-grained classification that require multiple machine learning systems and/or models. Thus, such a system as disclosed herein may be suitable for use on resource-constrained computing systems, such as mobile devices.

In one example, this disclosure describes a system for identifying discriminative, fine-grained features of an object in an image, comprising: an input device configured to receive the image of the object; a computation engine comprising processing circuitry for executing a machine learning system; and an output device configured to output part localization data for the object and classification data for the object, wherein the machine learning system comprises a model comprising a first set of filters, a second set of filters, and a third set of filters, wherein the machine learning system is further configured to apply the first set of filters to the received image to generate an intermediate representation of the received image suitable as an input to both the second set of filters and third set of filters, wherein the machine learning system is further configured to apply the second set of filters to the intermediate representation of the received image to generate the part localization data for the object, wherein the part localization data for the object comprises data identifying one or more sub-parts of the object and one or more regions of the received image in which the one or more sub-parts of the object are located, and wherein the machine learning system is further configured to apply the third set of filters to the intermediate representation of the received image to generate the classification data for the object, wherein the data identifying one or more sub-parts of the object and one or more regions of the received image in which the one or more sub-parts of the object are located along with the classification data for the object results in a more discriminative, fine-grained identification of one or more features of the object in the image.

In another example, this disclosure describes a method for identifying discriminative, fine-grained features of an object in an image, the method comprising: receiving, by an input device, the image of the object; applying, by a machine learning system executed by processing circuitry of a computation engine, a first set of filters of a model to the received image to generate an intermediate representation of the received image suitable as an input to both a second set of filters and a third set of filters of the model; applying, by the machine learning system, the second set of filters to the intermediate representation of the received image to generate the part localization data for the object, wherein the part localization data for the object comprises data identifying one or more sub-parts of the object and one or more regions of the received image in which the one or more sub-parts of the object are located; applying, by the machine learning system, the third set of filters to the intermediate representation of the received image to generate the classification data for the object; and outputting, by an output device, the part localization data for the object and the classification data for the object, wherein the data identifying one or more sub-parts of the object and one or more regions of the received image in which the one or more sub-parts of the object are located along with the classification data for the object results in a more discriminative, fine-grained identification of one or more features of the object in the image.

In another example, this disclosure describes a non-transitory computer-readable medium comprising instructions that, when executed, cause processing circuitry of a computation device to execute a machine learning system configured to identify discriminative, fine-grained features of an object in an image by: receive the image of the object; apply a first set of filters of a model to the received image to generate an intermediate representation of the received image suitable as an input to both a second set of filters and a third set of filters of the model; apply a second set of filters of the model to the intermediate representation of the received image to generate the part localization data for the object, wherein the part localization data for the object comprises data identifying one or more sub-parts of the object and one or more regions of the received image in which the one or more sub-parts of the object are located; apply a third set of filters to the intermediate representation of the received image to generate the classification data for the object; and output the part localization data for the object and the classification data for the object, wherein the data identifying one or more sub-parts of the object and one or more regions of the received image in which the one or more sub-parts of the object are located along with the classification data for the object results in a more discriminative, fine-grained identification of one or more features of the object in the image.

In another example, this disclosure describes a method for training a first set of filters, a second set of filters, and a third set of filters of a model of a machine learning system, executed by processing circuitry of a computation engine, to identify discriminative, fine-grained features of an object in an image, the method comprising: applying, by the machine learning system, training data comprising images of objects labeled with corresponding part localization data for the objects and corresponding classification data for the objects to train the first set of filters and the third set of filters together to generate classification data for the objects, wherein the classification data for the objects comprises data identifying a subordinate category within a basic level category to which the objects belong, applying the training data to train the first set of filters and the second set of filters together to generate part localization data for the objects, wherein the part localization data for the objects comprises data identifying one or more sub-parts of each of the objects and one or more regions of the received image in which the one or more sub-parts of each of the objects are located; applying the training data to train the first set of filters, the second set of filters, and the third set of filters together to generate both the part localization data for the objects and the classification data for the objects; and outputting the model.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Fine-grained classification amongst various classes of man-made and natural objects is currently an active area of research because of numerous practical applications. For instance, a system capable of recognizing make and models of vehicles may improve tracking of vehicles across non-overlapping camera views, or may use captured video from multiple locales to assist in searching for a given vehicle in a forensic investigation. Similarly, a system capable of recognizing species of birds may assist biologists in their counting in an area or understanding patterns of migration. While related to generic image classification, fine-grained classification is a significantly distinct problem because it must focus on small, localized intra-class differences (e.g., make-models of vehicles, bird species) instead of inter-class differences that are often easier to account for (e.g., vehicles vs. birds). Accounting for differences between similar looking objects within a class to recognize specific instances, while being robust to spurious changes caused by occlusions and overlap with surrounding objects makes this task very challenging.

An important aspect of the solution to the fine-grained classification is locating discriminative parts of objects. A learning network according to techniques described herein may focus on parts such as the position of car headlights to learn representations that distinguish makes and model of cars based upon different shapes of headlights. The techniques may enable solutions to more challenging tasks, such as "locate a Honda Civic 2006 with a dent on the left front door", since there is an understanding of parts semantics and their relative geometry. It is challenging to solve part localization and fine-grained classification simultaneously because the former is geometric in nature while the latter is a labeling problem. Previous work either solved these two problems separately or fused them together in complicated frameworks.

Figure 1:
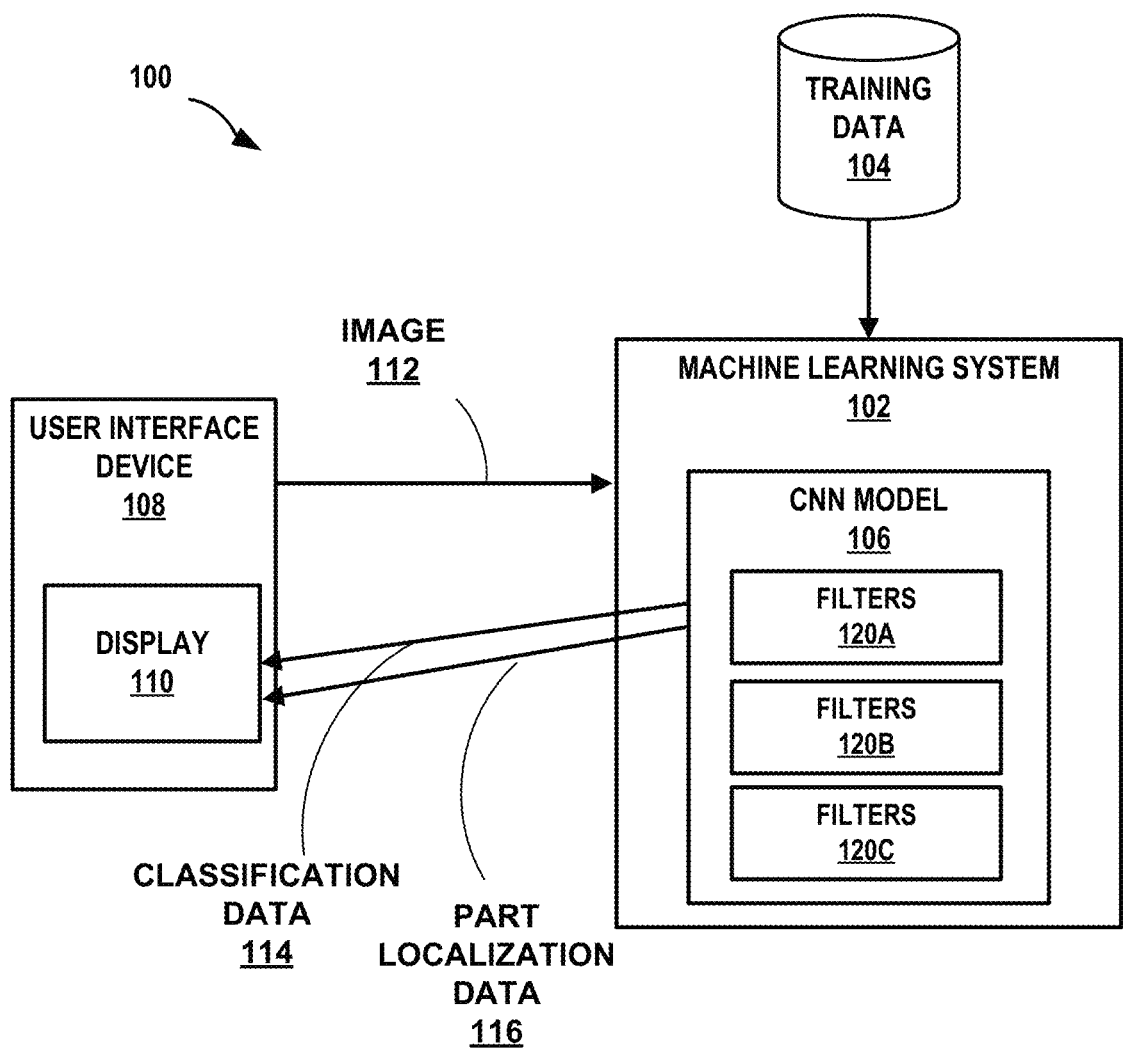
FIG. 1 is a block diagram illustrating an example machine learning system for identifying discriminative, fine-grained features of an object depicted in an image in accordance with the techniques of the disclosure.

FIG. 1 is a block diagram illustrating an example machine learning system for identifying discriminative, fine-grained features of an object depicted in an image, in accordance with the techniques of the disclosure. In one example, machine learning system 102 generates classification data 114 and part localization data 116 for an object depicted in image 112. As shown, system 100 includes user interface 108 and machine learning system 102.

In some examples, machine learning system 102 may comprise a computation engine implemented in circuitry. For instance, a computation engine of system 102 may include, any one or more of a microprocessor, a controller, a digital signal processor (DSP), an application specific integrated circuit (ASIC), a field-programmable gate array (FPGA), or equivalent discrete or integrated logic circuitry. In another example, system 102 may comprise any suitable computing system, such as desktop computers, laptop computers, gaming consoles, personal digital assistants (PDAs), smart televisions, handheld devices, tablets, mobile telephones, "smart" phones, etc. In some examples, at least a portion of system 102 may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

In some examples, system 102 may be implemented in circuitry, such as via one or more processors and/or one or more storage devices (not depicted). One or more of the devices, modules, storage areas, or other components of system 102 may be interconnected to enable inter-component communications (physically, communicatively, and/or operatively). In some examples, such connectivity may be provided by through system bus, a network connection, an inter-process communication data structure, or any other method for communicating data. The one or more processors of system 102 may implement functionality and/or execute instructions associated with system 102. Examples of processors include microprocessors, application processors, display controllers, auxiliary processors, one or more sensor hubs, and any other hardware configured to function as a processor, a processing unit, or a processing device. System 102 may use one or more processors to perform operations in accordance with one or more aspects of the present disclosure using software, hardware, firmware, or a mixture of hardware, software, and firmware residing in and/or executing at system 102.

One or more storage devices within system 102 may store information for processing during operation of system 102. In some examples, one or more storage devices are temporary memories, meaning that a primary purpose of the one or more storage devices is not long-term storage. Storage devices on system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices, in some examples, also include one or more computer-readable storage media. Storage devices may be configured to store larger amounts of information than volatile memory. Storage devices may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices may store program instructions and/or data associated with one or more of the modules described in accordance with one or more aspects of this disclosure.

The one or more processors and one or more storage devices may provide an operating environment or platform for one or more modules, which may be implemented as software, but may in some examples include any combination of hardware, firmware, and software. The one or more processors may execute instructions and the one or more storage devices may store instructions and/or data of one or more modules. The combination of processors and storage devices may retrieve, store, and/or execute the instructions and/or data of one or more applications, modules, or software. The processors and/or storage devices may also be operably coupled to one or more other software and/or hardware components, including, but not limited to, one or more of the components illustrated in FIG. 2 below.

In some examples, training data 104 includes images of one or more objects. In some examples, training data 104 includes labels defining part localization data for the one or more objects. For example, the part localization data may identify one or more sub-parts of an object within an image and one or more regions of the image within which the one or more sub-parts are located. In some examples, training data 104 includes classification data for the one or more objects. For example, the classification data may identify a class of objects to which the object belongs.

In some examples, training data 104 comprises a plurality of images that are converted into vectors and tensors (e.g., multi-dimensional arrays) upon which machine learning system 102 may apply mathematical operations, such as linear algebraic, nonlinear, or alternative computation operations. In some examples, training data 104 represents a set of normalized and standardized images of the one or more objects specifying part localization data and classification data for the one or more objects. In some examples, statistical analysis, such as a statistical heuristic, is applied on training data 104 to determine a set of one or more images that are a representative sample of training data 104. In other examples, a big data framework is implemented so as to allow for the use of a large amount of available data as training data 104.

One example of training data 104 is a modified Stanford Cars-196 dataset. The Stanford Cars-196 dataset includes 196 classes of car categories described by make, model and year, and has a total of 16185 images. This dataset has a large variation of car model, pose, and color; and often minor differences between models. The dataset also provides car bounding boxes. The original Stanford Cars-196 dataset does not provide information about parts, but the modified Stanford Cars-196 dataset described herein includes 30 images per class annotated with 18 parts, such as "front right light", "rear left bumper" and so on. Another example of training data 104 is the Caltech-UCSD Birds (CUB-200-2011) dataset. The Caltech-UCSD Birds includes 200 bird spices with 11788 images captured in the wild. Each image is annotated with a bounding box and 15 body parts such as "head," "breast," etc.

To perform complex tasks, such as fine-grained classification of a recognized object within an image, a machine learning system may need to perform multiple discrete tasks, such as part localization (e.g., identifying one or more sub-parts of an object within the image and one or more regions of the image within which the one or more sub-parts are located) and object classification (e.g., identify a class of objects to which the identified object belongs). A well-optimized conventional machine learning system may successfully perform a single specific task with a high degree of accuracy but may perform other types of tasks with much lower rates of success. Thus, conventionally, a model of a machine learning system is trained and optimized to perform one specific task. For example, one model of a machine learning system may process an object identified in an image to perform part localization. Another model may process the identified object to perform classification on the identified object. The machine learning system may amalgamate the part localization data and classification data generated for the object to perform fine-grained classification of the object. However, requiring separate machine learning system models, each requiring independent training, optimization, and computing resources, is cumbersome and has prevented the widespread adoption of machine learning systems on computing systems with low or restricted resources, such as mobile devices.

In accordance with the techniques of the disclosure, machine learning system 102 may identify discriminative, fine-grained features of an object in image 112. In one example, machine learning system 102 processes training data 104 to train convolutional neural network model 106 to identify discriminative, fine-grained features of an object depicted in image 112. In one example, machine learning system 102 processes training data 104 to train convolutional neural network model 106 to generate classification data 114 and part localization data 116 for the object depicted in image 112.

In some examples, machine learning system 102 uses training data 104 to teach convolutional neural network model 106 to weigh different features depicted in the plurality of images of the one or more objects. In some examples, machine learning system 102 uses training data 104 to teach convolutional neural network model 106 to apply different coefficients that represent features in the image as having more or less importance with respect to determining whether the feature represents an object or a sub-part of the object that is depicted in the image. The number of images required to train the image rendering model may depend on the number of objects and/or sub-parts to recognize, the complexity of the objects and/or sub-parts, and the variety and/or quality of the plurality of images. In some examples, the plurality of images includes at least several hundred examples to train an effective image rendering model. In some examples, machine learning system 102 uses training data 104 to optimize convolutional neural network model 106 and increase the accuracy of results produced by convolutional neural network model 106, as described in further detail below.

In one example, system 100 may additionally comprise test data (not depicted). The test data includes a plurality of images of one or more objects. Machine learning system 102 may apply trained convolutional neural network model 106 to the test data to evaluate the accuracy of results produced by convolutional neural network model 106 or an error rate of convolutional neural network model 106. In some examples, Machine learning system 102 applies trained convolutional neural network model 106 to the test data to validate that trained convolutional neural network model 106 accurately recognizes images, accurately identifies one or more objects in the images, accurately identifies part localization data for the one or more objects, accurately identifies classification data for the one or more objects, accurately identifies discriminative, fine-grained features of the one or more objects, or some combination thereof. In some examples, machine learning system 102 applies trained convolutional neural network model 106 to the test data to validate that trained convolutional neural network model 106 performs accurately above a threshold percentage (e.g., 50%, 75%, 90%, 95%, 99%).

Thus, machine learning system 102 may be configured to train convolutional neural network model 106 to identify discriminative, fine-grained features of one or more objects in an image. For example, machine learning system 102 trains convolutional neural network model 106 to identify characteristics in one or more sub-parts of an object. For example, machine learning system 102 may train convolutional neural network model 106 to not only identify elements characteristic of a make, model, and year of a vehicle, such as a 2006 Honda Civic, but additionally uniquely identify a specific 2006 Honda Civic by determining specific, fine-grained features unique to that vehicle (e.g., a dent on the left front door). As a further example, machine learning system 102 may train convolutional neural network model 106 to not only identify elements characteristic of a species of animal, such as a red-tailed hawk, but additionally uniquely identify a specific red-tailed hawk by determining specific, fine-grained features unique to that animal (e.g., plumage patterns or unique markings). In some examples, machine learning system 102 processes large quantities of images to train convolutional neural network model 106 to identify these characteristics. Convolutional neural network model 106 may be further configured to apply the characteristics to new images as described below.

In one example, machine learning system 102 applies techniques from the field of deep learning, such as the use of a convolutional neural network. This area of study uses neural networks to recognize patterns and relationships in training examples, creating models, such as convolutional neural network model 106, that subsequently may be used to identify new characteristics in accordance with the model built by the original training data. Machine learning system 102, as described herein, may apply such neural networks to image recognition to identify discriminative, fine-grained features of an object in an image. Accordingly, a system as disclosed herein may be capable of capturing and accounting for differences between similar looking objects within the same class to recognize specific instances of the object.

As an illustrative example, user interface device 108 is configured to receive, from a user, image 112 of an object. The image depicts one or more objects. In some examples, the image depicts one or more vehicles, animals, or other types of objects which may be differentiated into subordinate categories within a basic level category. In some examples, user interface device 108 is or otherwise includes a workstation, a keyboard, pointing device, voice responsive system, video camera, biometric detection/response system, button, sensor, mobile device, control pad, microphone, presence-sensitive screen, network, or any other type of device for detecting input from a human or machine. In some examples, user interface device 108 further includes display 110 for displaying an output to the user. Display 110 may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, user interface device 108 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, user interface device 108 may include a presence-sensitive display that may serve as a user interface device that operates both as one or more input devices and one or more output devices.

Machine learning system 102 applies convolutional neural network model 106, trained with training data 104 as described above, to image 112 to generate classification data 114 and part localization data 116 for the object. In some examples, machine learning system 102 uses classification data 114 and part localization data 116 for the object to uniquely distinguish the object from other similar objects in a subordinate category of similar objects so as to efficiently perform fine-grained classification of the object.

For example, machine learning system 102 may convert image 112 into one or more vectors and tensors (e.g., multi-dimensional arrays) that represent image 112. Trained convolutional neural network model 106 may apply mathematical operations to the one or more vectors and tensors to generate a mathematical representation of one or more features of image 112. For example, as described above, trained convolutional neural network model 106 may determine different weights that correspond to identified characteristics of one or more features of an object. Trained convolutional neural network model 106 may apply the different weights to the one or more vectors and tensors of the one or more features of image 112 to generate classification data 114 and part localization data 116 for an object depicted in image 112. In some examples, machine learning system 102 outputs classification data 114 and part localization data 116 for the object to display 110 for presentation to the user. In another example, machine learning system 102 uses classification data 114 and part localization data 116 for the object to uniquely distinguish the object from other similar objects in a subordinate category of similar objects so as to efficiently perform fine-grained classification of the object, and outputs the fine-grained classification of the object to display 110 for presentation to the user.

Figure 2:
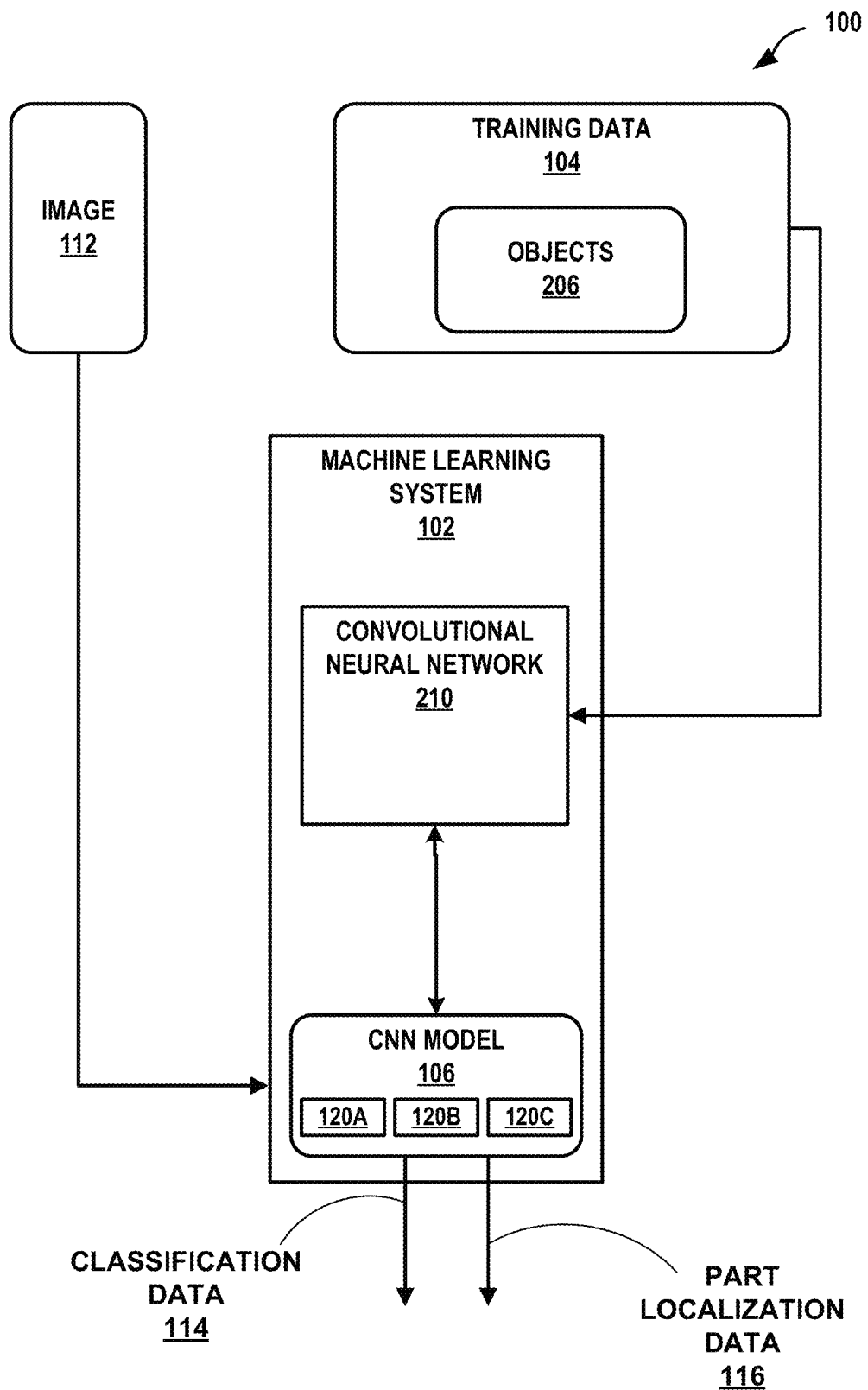
FIG. 2 is a block diagram illustrating in further detail the example system of FIG. 1 for identifying discriminative, fine-grained features of an object depicted in an image.

In some examples, and as discussed further with respect to FIG. 2, convolutional neural network model comprising a first set of filters 120A, second set of filters 120B, and a third set of filters 120C is used to generate convolutional model 106. In one example, machine learning system 102 applies first set of filters 120A to image 112 to generate an intermediate representation of image 112 suitable as an input to both second set of filters 120B and third set of filters 120C. Machine learning system 102 applies second set of filters 120B to the intermediate representation of image 112 to generate part localization data 116 for the object. In some examples, part localization data 116 comprises data identifying one or more sub-parts of the object and one or more regions of image 112 in which the one or more sub-parts of the object are located. Machine learning system 102 further applies third set of filters 120C to the intermediate representation of image 112 to generate classification data 114. In some examples, classification data 114 comprises data identifying a subordinate category within a basic level category to which the object belongs.

In one example, the above process may iteratively repeat to allow for user feedback and refinement of the accuracy of the classification data 114 and part localization data 116. For example, a user provides image 112 to machine learning system 102 as described above. Machine learning system 102 generates classification data 114 and part localization data 116 as a candidate classification data and candidate part localization data. Machine learning system 102 receives, via user interface device 108, input specifying an accuracy or an error rate of the candidate classification data and candidate part localization data. Machine learning system 102 generates, based on the input specifying an accuracy or an error rate of the candidate classification data and candidate part localization data, classification data 114 and part localization data 116 as a second candidate classification data and candidate part localization data. The process of generating candidate classification data and candidate part localization and receiving input specifying an accuracy or an error rate of the candidate classification data and candidate part localization data may continue until the user is satisfied with the accuracy of machine learning system 102.

Accordingly, system 100 may provide a multi-task, deep-learning approach to simultaneously solve part localization and fine-grained classification of an object in an image. System 100 may be capable of capturing and accounting for differences between similar looking objects within the same class to recognize specific instances of the object. Further, such a system as disclosed herein may be robust to changes caused by occlusions and overlap with surrounding objects. The network architecture and training procedure of system 100 may be less complex than conventional systems while achieving better results, significantly faster, and using a smaller memory footprint. Such a system as disclosed herein may be more efficient, faster, and use less computational resources than conventional systems that perform fine-grained classification that require multiple machine learning systems and/or models. Thus, such a system as disclosed herein may be suitable for use on resource-constrained computing systems, such as mobile devices.

FIG. 2 is a block diagram illustrating, in further detail, example system 100 of FIG. 1 for identifying discriminative, fine-grained features of an object depicted in image 112. Machine learning system 102 represents one or more computing devices to perform operations described herein to process training data 104 to develop convolutional neural network model 106 and to process image 112 to generate classification data 114 and part localization data 116 for an object depicted in image 112. For example, machine learning system 102 may include processing circuitry and memory as described above.

In some examples, training data 104 includes a plurality of images of one or more objects. In some examples, training data 104 includes labels defining part localization data for the one or more objects. For example, the part localization data may identify one or more sub-parts of an object within an image and one or more regions of the image within which the one or more sub-parts are located. In some examples, training data 104 includes classification data for the one or more objects. For example, the classification data may identify a class of objects to which the object belongs. Machine learning system 102 inputs and processes training data 104 to train convolutional neural network model 106 for application to image 112 to generate to generate classification data 114 and part localization data 116 for an object depicted in image 112.

In the example of FIG. 2, machine learning system 102 includes convolutional neural network (CNN) 210. CNN 210 may model part localization as a multi-class classification problem by representing parts as a label mask that annotates part locations, as opposed to the traditional regression of geometric coordinates of parts. Such techniques may reduce the difference in the nature of localization and classification problems and narrows the gap between the problems of part localization and fine-grained classification. CNN 210 may therefore share a significant number of network parameters between fine-grained classification and part localization tasks and take advantage of pre-trained models as a starting point for optimization.

In accordance with the techniques of the disclosure, machine learning system 102 trains CNN 210 to receive images of objects and identify discriminative, fine-grained features of the objects depicted in the images. In this example, machine learning system 102 trains convolutional neural network model 106 for CNN 210 to receive image 112 and identify discriminative, fine-grained features of an object depicted in image 112. In one example, CCN 210 comprises a plurality of convolutional filters. Each filter comprises a vector of weights and a bias. As described herein, the terms "filter" and "layer" of CCN 210 may be used interchangeably. CNN 210 receives image 112 as an input, applies a convolution operation of a first filter of the plurality of filters to image 112, and passes the output of the first filter to the next filter of the plurality of filters. Thus, CNN 210 applies each filter of the plurality of filters to an output of a previous filter of the plurality of filters. Further, an output of each filter may "map" to an input of a subsequent filter to form the neural network relationships of CNN 210. CNN 210 may "learn" or train convolutional neural network model 106 by making incremental adjustments to the biases and weights of each of filters 120.

In the example of FIG. 2, CNN model 106 includes a first set of filters 120A, a second set of filters 120B, and a third set of filters 120C (collectively, "filters 120"). In one example, first set of filters 120A comprise four levels of convolutional layers. Further, in some examples, each of second set of filters 120B and third set of filters 120C comprise task-specific, dedicated convolution layers. Together, first, second, and third sets of filters 120 may be trained together, end-to-end, to create convolutional neural network model 106 that is capable of simultaneously predicting fine-grained class data and part location data for an object in image 112. Such an architecture may allow for system 100 to solve part localization and fine-grained classification tasks for image 112 at the same time. However, unlike conventional approaches, convolutional neural network model 106 (and the associated training approach described herein) may be constructed to explicitly share information between the parts localization layers and fine-grained classification layers. The architecture of system 100 forces weight-sharing between the two tasks, and the training approach described herein ensures that the part localization and fine-grained classification tasks influence one another. Thus, convolutional neural network model 106 and the accompanying training regime disclosed herein may allow for performing seamless end-to-end training and efficient processing of image 112.

In some examples, machine learning system 102 applies training data 104 to first set of filters 120A and third set of filters 120C together to train CNN model 106 to generate classification data 114 for objects 206 in training data 104. Further, machine learning system 102 applies training data 104 to first set of filters 120A and second set of filters 120B together to train CNN model 106 to generate parts localization data 116 for objects 206 in training data 104. Finally, machine learning system 102 applies training data 104 to first set of filters 120A, second set of filters 120B, and third set of filters 120C together to train CNN model 106 to generate both classification data 114 and parts localization data 116 for objects 206 in training data 104.

In one example, machine learning system 102 applies training data 104 to filters 120 in a specific order to train CNN model 106. For example, machine learning system 102 may first apply training data to first set of filters 120A and third set of filters 120C together. Machine learning system 102 may second apply training data to first set of filters 120A and second set of filters 120B together, and finally apply training data to first set of filters 120A, second set of filters 120B, and third set of filters 120C together. However, in other examples, machine learning system 102 applies training data 104 to filters 120 in a different order, in a random order, or only applies training data 104 to all of filters 120 simultaneously.

As an illustrative example, CNN model 106 applies first set of filters 120A to image 112 to generate an intermediate representation of image 112 suitable as an input to both second set of filters 120B and third set of filters 120C. CNN model 106 applies second set of filters 120B to the intermediate representation of image 112 to generate part localization data 116. In some examples, part localization data 116 comprises data identifying one or more sub-parts of the object and one or more regions of image 112 in which the one or more sub-parts of the object are located. In one example, filters 120B comprise a set of fully-convolutional layers that produce a part label mask for the object.

CNN model 106 applies third set of filters 120C to the intermediate representation of image 112 to generate classification data 114. Classification data 114 comprises data identifying a subordinate category within a basic level category to which the object belongs. In some one example, filters 120C comprise a mixture of convolutional and embedded bilinear-pooling layers that produce fine-grained classification for the object.

Further, CNN 210 combines part localization loss for the object and fine-grained classification loss for the object. By combining the loss, CNN 210 may enable end-to-end, multi-task, data-driven training of all network parameters of convolutional neural network model 106. In some examples, CNN 210 provides a novel multi-task deep learning and fusion architecture that have both shared and dedicated convolutional layers for simultaneous part labeling and classification. In one example, the classification is a make and model of a vehicle. Further, the accuracy of CNN 210 is competitive to conventional methods that generate fine-grained classification data for vehicle objects or animal objects. In some examples, CNN 210 is more compact (e.g., may use less than 30 million parameters) and may run faster (e.g., up to 78 Frames per Second) over conventional systems. Such advantages may allow CNN 210 to be implemented in real-time, mobile applications.

In one example, CNN 210 is based on a Visual Geometry Group (VGG)-16 network, a 16-layer convolutional neural network (available at https://gist.github.com/ksimonyan/211839e770f7b538e2d8) that is pre-trained with the ImageNet dataset (available at http://image-net.org/index). The VGG-16 network may provide several advantages. For example, the VGG-16 network uses 3×3 convolutional kernels that may be efficiently computed. Further, low and mid-level representations captured by the layers of a VGG network may be easily interpreted. The VGG-16 network may further be more portable than other types of convolutional networks. However, in some examples, CNN 210 is based on another type of neural network, such as an Inception neural network or a ResNet neural network. The implementation of different types of neural networks for CNN 210 instead of VGG-16 may further improve the performance of the techniques of the disclosure and are expressly contemplated herein.

Machine learning system 102 may use part localization data 116 and classification data 114 for an object depicted in image 112 to uniquely distinguish the object from other similar objects in a subordinate category of similar objects so as to efficiently perform fine-grained classification of the object. For example, image 112 may be an image of a vehicle. In this example, second set of filters 120B generates part localization data for the vehicle depicted in image 112. The part localization data for the vehicle may comprise data identifying one or more components of the vehicle and one or more regions of image 112 in which the one or more components of the vehicle are located. Further, third set of filters 120C generates classification data for the vehicle. The classification data for the vehicle may comprise data identifying a make and model of the vehicle. Based on the part localization data for the vehicle and the classification data for the vehicle, machine learning system 102 may uniquely distinguish the vehicle from other similar vehicles of the same make and model.

As another example, image 112 may be an image of an animal. In this example, second set of filters 120B generates part localization data for the animal depicted in image 112. The part localization data for the animal may comprise data identifying one or more body parts of the animal and one or more regions of image 112 in which the one or more body parts of the animal are located. Further, third set of filters 120C generates classification data for the animal. The classification data for the animal may comprise data identifying a species of the animal. Based on the part localization data for the animal and the classification data for the animal, machine learning system 102 may uniquely distinguish the animal from other animals of the same species.

Accordingly, a system as disclosed herein may be capable of capturing and accounting for differences between similar looking objects within the same class to recognize specific instances of the object. Further, such a system may be robust to changes caused by occlusions and overlap with surrounding objects. Additionally, such a system as disclosed herein may be more efficient, faster, and use less computational resources than conventional systems that perform fine-grained classification that require multiple machine learning systems and/or models. Thus, such a system as disclosed herein may be suitable for use on resource-constrained computing systems, such as mobile devices.

Figure 3:
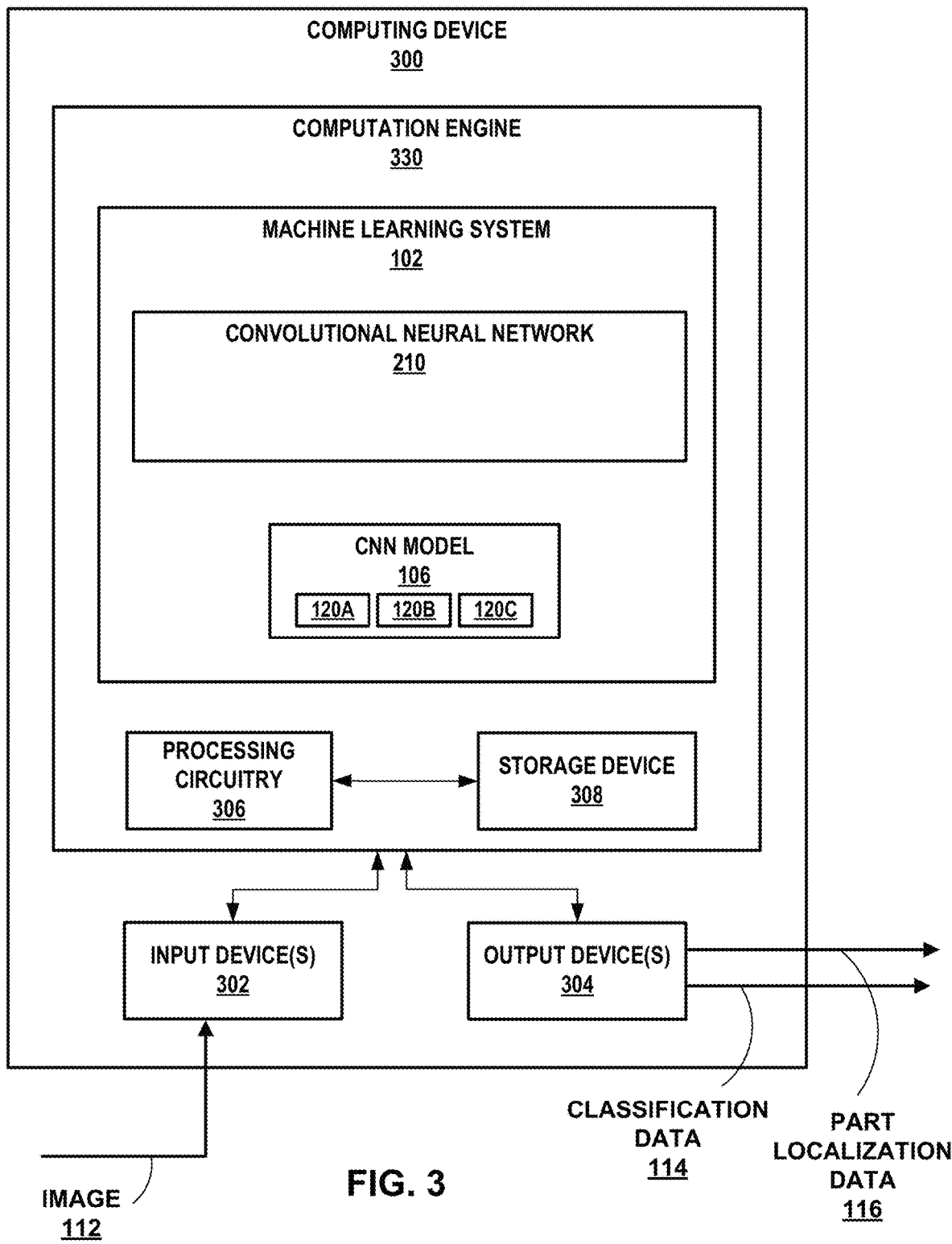
FIG. 3 is a block diagram illustrating an example computing device for generating classification data and part localization data for an object depicted in an image in accordance with the techniques of the disclosure.

FIG. 3 is a block diagram illustrating example computing device 300 for generating classification data 114 and part localization data 116 for an object depicted in image 112 in accordance with the techniques of the disclosure. In the example of FIG. 3, computing device 300 includes computation engine 330, one or more input devices 302, and one or more output devices 304.

In the example of FIG. 3, a user of computing device 300 may provide image 112 of an object to computing device 300 via one or more input devices 302. Input devices 302 may include a keyboard, pointing device, voice responsive system, video camera, biometric detection/response system, button, sensor, mobile device, control pad, microphone, presence-sensitive screen, network, or any other type of device for detecting input from a human or machine.

Computation engine 330 may process image 112 using machine learning system 102. Machine learning system 102 may represent software executable by processing circuitry 306 and stored on storage device 308, or a combination of hardware and software. Such processing circuitry 306 may include any one or more of a microprocessor, a controller, a digital signal processor (DSP), an application specific integrated circuit (ASIC), a field-programmable gate array (FPGA), or equivalent discrete or integrated logic circuitry. Storage device 308 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. In some examples, at least a portion of computing device 300, such as processing circuitry 306 and/or storage device 308, may be distributed across a cloud computing system, a data center, or across a network, such as the Internet, another public or private communications network, for instance, broadband, cellular, Wi-Fi, and/or other types of communication networks, for transmitting data between computing systems, servers, and computing devices.

Computation engine 330 may process image 112 using machine learning system 102 to identify discriminative, fine-grained features of an object in image 112. In the example of FIG. 3, machine learning system 102 includes convolutional neural network (CNN) 210 and convolutional neural network model 106. CNN model 106 applies first set of filters 120A to image 112 to generate an intermediate representation of image 112 suitable as an input to both second set of filters 120B and third set of filters 120C. CNN model 106 applies second set of filters 120B to the intermediate representation of image 112 to generate part localization data 116 for the object depicted in image 112. In some examples, part localization data 116 comprises data identifying one or more sub-parts of the object and one or more regions of image 112 in which the one or more sub-parts of the object are located. CNN model 106 further applies third set of filters 120C to the intermediate representation of image 112 to generate classification data 114 for the object depicted in image 112. In some examples, classification data 114 comprises data identifying a subordinate category within a basic level category to which the object belongs. Machine learning system 102 may use part localization data 116 and classification data 114 to uniquely distinguish the object from other similar objects in a subordinate category of similar objects so as to efficiently perform fine-grained classification of the object.

While in the example of FIG. 3, machine learning system 102 implements a CNN, in other examples other types of neural networks may be used. For example, machine learning system 102 may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train one or more models 106 for generating part localization data 116 and classification data 114.

In some examples, output device 304 is configured to output, to the user, part localization data 116 and classification data 114. Output device 304 may include a display, sound card, video graphics adapter card, speaker, presence-sensitive screen, one or more USB interfaces, video and/or audio output interfaces, or any other type of device capable of generating tactile, audio, video, or other output. Output device 304 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 304 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 304 may include a presence-sensitive display that may serve as a user interface device that operates both as one or more input devices and one or more output devices.

Figure 4:
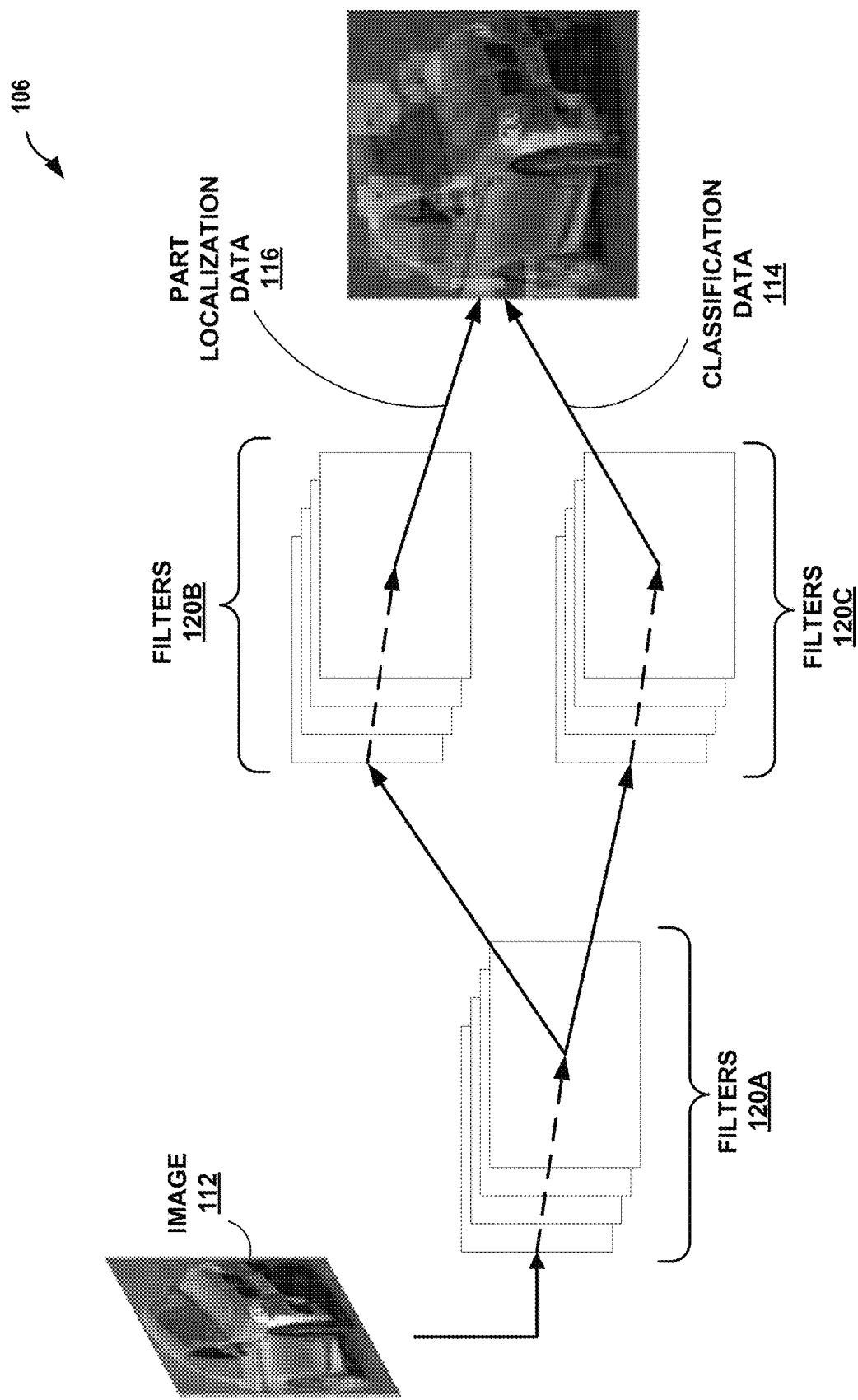
FIG. 4 is a block diagram illustrating an example convolutional neural network for generating classification data and part localization data for an object depicted in an image in accordance with the techniques of the disclosure.

FIG. 4 is a block diagram illustrating an example convolutional neural network 210 for generating classification data 114 and part localization data 116 for an object depicted in an image 112 in accordance with the techniques of the disclosure. CNN model 106 includes first set of filters 120A, second set of filters 120B, and third set of filters 120C, each of which may be substantially similar to the like components of FIG. 2. In the example of FIG. 4, second set of filters 120B generate part localization data 116 for the object depicted by image 112. Further, third set of filters 120C generate classification data 114 for the object depicted by image 112.

In one example, both second set of filters 120B and third set of filters 120C use the same lower-level convolutional architecture (e.g., first set of filters 120A). Thus, CNN model 106 fuses an object classification network and a part classification network together such that the networks use the same weights for a number of shared layers (e.g., first set of filters 120A). An important design consideration is the number of layers that are shared between the object classification network and the part classification network. For example, first set of filters 120A includes too few layers, CNN model 106 may render ineffective gradient flows from task-specific sub-networks to the fused layers. Additionally, if first set of filters 120A includes too many layers, CNN model 106 may degrade performance of the later, task-specific sub-networks.

To determine an appropriate number of layers to share, a series of experiments were conducted. First, an object classification network and a part classification network were separately trained to serve as a baseline for measuring performance on the two tasks. Next, various weights of the first three, four and five convolutional layers of first set of filters 120A were switched, and second set of filters 120B and third set of filters 120C were retrained. By swapping weights of first set of filters 120A, and then measuring task performance, a determination of which weights may be shared across tasks was made. For example, the performance of both task-specific networks drops significantly when all convolution layers are switched. The analysis indicated that features learned by the first four convolutional layers in both task-specific networks may be applied effectively to the other task, so one example architecture of CNN 210 shares these weights.

Furthermore, the multi-task architecture of CNN 210 is trained in an end-to-end fashion using the following multi-task fusion loss:

$$\mathcal{L}_{fuse} = \mathcal{L}_{loc} + \lambda \mathcal{L}_{cls},$$

where λ is a weight factor to control the influence of each task during joint training. CNN 210 shares layers between the two tasks. The detailed design of dedicated layers for each task is described in more detail below.

Key-point (and, equivalently, part) localization has been widely studied for the purpose of pose estimation and has largely been solved by learning a regression layer at the end of a deep network to extract the x, y coordinates of trained key-points. The regression task is sufficiently different from the image classification task such that networks must be trained from scratch, rather than fine-tuned from a pre-trained network. This not only increases the amount of training data required, but also extends training time. In order to share layers between the localization task and the fine-grained classification task, rather than model part localization as a regression problem, CNN 210 models the multiple tasks as a multi-class part classification problem. Thus, CNN 210 may be fine-tuned from a pre-trained classification network and may enable weight-sharing with the fine-grained classification network. Experiments show that CNN 210, when using the techniques of the disclosure, may provide improved part localization performance over conventional neural networks.

The parts localization approach of CNN 210 may be based upon mask generation. In one example, a VGG-16 architecture is modified to be fully convolutional in the latter stages (e.g., second set of filters 120B and third set of filters 120C) such that the output mask has dimensions 28×28. Specifically, the first four convolution layers are unchanged (e.g., first set of filters 120A), except that the spatial pooling is dropped after a fourth convolutional filter. In one example, a fifth convolutional filter is modified to use dilated (or atrous) convolutions without downsampling. In addition, the fully connected layers of the VGG-16 architecture are converted into fully convolutional layers with kernels in spatial size of 1×1. These modifications allow CNN 210 to reuse the same pretrained VGG-16 network weights, but output a 28×28 spatial part localization mask instead. In one example, similar to techniques that use semantic segmentation, CNN 210 outputs a mask that comprises a labeled image, with pixels marked as containing a particular subpart of an object or as belonging to a background of the image.

CNN 210 may implement various learning techniques. For example, given a specific part $p_c \in P = \{p_1, p_2, \ldots, p_K\}$, where c is a part class of an object (such as a "front left light" of a vehicle) of total K classes (K+1 is the background class label), with normalized spatial coordinate $x \in [0,1]$, $y \in [0,1]$, a localization network should generate an m×m spatial map S that predicts $S_{u,v} = c$, with $u = \lfloor x \cdot m \rfloor$ and $v = \lfloor y \cdot m \rfloor$, where $\lfloor x \rfloor$ is a truncating operator to an integer from a real number. However, the area of part locations on this spatial map may be significantly smaller $k \ll m^2$, which may cause the learning process to become highly imbalanced (e.g., a ratio of the background to key-points ratio may be defined as $$\frac{m^2 - k}{k} \to 1 \bigg).$$

Thus, a pseudo-masking is applied around ground-truth part locations to make the learning easier. The pseudo masking strategy is defined as:

$$M_{i,j} = \begin{cases} K = 1, & \text{if } \min dist((i, j), (x_c, y_c)) \geq t \\ \operatorname{argmin} dist((i, j), (x_c, y_c)), & \text{otherwise} \end{cases}$$

where dist(•) is a function that measures the distance and t is a trade-off to control ratio of the background to key-points. In some examples, t=0.1 meters. Further, the loss function is defined as:

$$\mathcal{L}_{loc} = \sum_{i=1}^{m} \sum_{j=1}^{m} \log \frac{f(i, j, M_{i,j})}{\sum_{c=1}^{K+1} f(i, j, c)}$$

where f(•) represents the network. The loss includes the background class K+1.

Although the localization network predicts a pseudo-part map, CNN 210 may still recover an accurate key-point coordinate by exploring the probability maps underneath. For example, CNN 210 does not need to set up a threshold to determine the existence of a specific part location because the part location is already handled by the pseudo masking strategy. Fpr example, given an m×m prediction map S and an m×m×(K+1) probability map Prob extracted from the last fully convolutional layer of the part-localization network, the coordinates $i_c$, $j_c$ of a part c can be inferred by:

$$(i_c, j_c) = \operatorname{argmax}_{i,j} \{ \text{Prob}_{i,j,c} \cdot 1_{S_{i,j} = c} \}$$

where $1_a$ is the indicator function which is 1 if condition a is true and 0 otherwise. Thus, CNN 210 has multiple advantages over conventional systems for fine-grained classification. For example, the localization network of CNN 210 shares the same amount of weights as a convolutional neural network such as VGG-16. Thus, CNN 210 may be fine-tuned using existing models and conventional techniques. Further, the network of CNN 210 requires only a small (e.g., 224×224) input size, yet still generates a large part prediction mask. Additionally, CNN 210 models the localization task as a classification problem, which enables straightforward fusion with the fine-grained classification task.

In some examples, CNN 210 may perform classification with feature embedding. In some examples, CNN 210 may implement dedicated fine-grained classification layers. In some examples, one or more layers of CNN 210 are embedded bilinear pooling layers. Bilinear pooling has been proven effective in representing feature variations from multiple streams of features. In contrast to conventional systems that use two different networks to conduct bilinear pooling, CNN 210 may effectively use embedded bilinear pooling within a single network. For example, given a w×h×ch shaped feature map F generated from a network, embedded bilinear pooling can be calculated as:

$$E = \sum_{i=1}^{w} \sum_{j=1}^{h} F_{i,j} \cdot F_{i,j}^T$$

where $F_{i,j}$ is a ch-dimensional column vector. This form is closely related to region covariance that captures second order statistics between features, and may improve the classification performance.

Embedded bilinear pooling reduces the training parameters of CNN 210 from w×h×ch×1 to ch×ch×1, where "1" is the number of hidden units of fully connected layer for prediction. However, this is still a large number that may, in some examples, overwhelm the whole training process, and may further lead to inefficient utilization of learned weights. In some examples, CNN 210 uses compact bilinear pooling to overcome this problem. Compact bilinear pooling is a projection method that further reduces the number of dimensions in the feature vector of CNN 210 while preserving desirable properties of the feature. For example, given mapping vectors $h \in \mathbb{N}^d$, where each entry is uniformly sampled from $\{1, 2, \ldots, c\}$, and $s \in \{+1, -1\}^d$, and where each entry is sampled with either +1 or −1 with equal probability, the sketch function is defined as:

$$\Psi(x, s, h) = [C_1, C_2, \ldots C_d]$$

where:

$$C_j = \sum_{i:h(i)=j} s(i) \cdot x(i)$$

To reduce the dimensionality of bilinear features, the ch×ch size bilinear feature E is first vectorized to $x \in \mathbb{R}^d$, where d=ch×ch, and further projected to a lower c-dimensional vector $\hat{E} \in \mathbb{R}^c$ by:

$$\hat{E} = \mathcal{F}^{-1}(\mathcal{F}(\Psi(x,s,h)) \circ \mathcal{F}(\Psi(x,s',h')))$$

where s' and h' are drawn similarly to s and h, ∘ operator represents element-wise multiplication, and represents the Fast Fourier Transformation. The result of the tensor sketching process is a lower-dimensional version of E, $\hat{E}$.

With respect to classification loss, the reduced features $\hat{E}$ can be mapped to C fine-grained classes using a small, fully connected layer fc(•), trained using multinomial logistic loss as defined below:

$$\mathcal{L}_{cls} = \sum_{i=1}^{c} \log \frac{fc(\hat{E}, i)}{\sum_{c=1}^{C} fc(\hat{E}, c)}$$

The classification network design of CNN 210 has multiple advantages. For example, CNN 210 greatly reduces the number of parameters by replacing fully connected layers with an embedded bilinear layer. Further, CNN 210 may allow for exploration of the second order information between feature maps through the embedded bilinear layer. In some examples, CNN 210 may further reduce the number of required parameters by introducing a random mapping technique.

In one example of CNN 210 described above, a multitask network is implemented using a customized Caffe package. Each input image is cropped to the object's bounding box and then resized, e.g., to 224×224. In one example, CNN 210 implements a 3-step process to speed up training. First, CNN 210 freezes the weights of the part localization subnetwork (e.g., second set of filters 120B), and CNN 210 applies training data 104 to the classification network, including layers shared with the localization task (e.g., first set of filters 120A and third set of filters 120C), to fine-tune the classification network. Second, CNN 210 freezes the weights of the classification network (e.g. third set of filters 120C), and applies training data 104 to the parts localization network, including the shared weights (e.g., first set of filters 120A and second set of filters 120B) to fine tune the parts localization network. Finally, CNN 210 applies training data 104 to the whole network together (e.g., first set of filters 120A, second set of filters 120B, and third set of filters 120C), with small learning rate and high momentum, to fine-tune the whole network. The training approach described above performs gradual specialization of the base VGG-16 weights by incrementally adapting the network to new tasks. For example, the first application of training data 104 (e.g., to first set of filters 120A and third set of filters 120C) adapts the classification network to the new image domain. The second application of training data 104 (e.g., to first set of filters 120A and second set of filters 120B), assisted by adaptation of the shared layers in the first application, adapts the part-localization subnetwork to domain-specific parts. The third application of training data 104 (e.g., to first set of filters 120A, second set of filters 120B, and third set of filters 120C), tunes the entire network via multi-task loss, enabling task-to-task feedback via the shared layers.

The techniques for training CNN 210 disclosed above may provide numerous advantages over conventional systems for fine-grained classification. For example, CNN 210 may run significantly faster than conventional systems. In one example implementation on a Titan X Maxwell graphics card available from NVIDIA, the techniques of the disclosure enabled CNN 210 to operate 4 times faster than conventional systems. At least a portion of the efficiency gain may arise from the benefits of effective network fusion described above. Further, the classification performance of CNN 210 is still competitive with conventional systems. In some examples, CNN 210 may achieve 93.1% top-1 accuracy on the Stanford Cars-196 dataset, e.g., a 0.3% improvement as compared to conventional systems. Further, CNN 210 may be more computationally efficient than conventional systems which perform only classification. Further, CNN 210 may additionally solve part localization simultaneously.

In one example, the performance of CNN 210 with respect to part localization performance is evaluated using the APK (average precision of key points) metric. This metric considers a predicted key-point (part location) to be correct if it lies in a radius of α×(image size) around the ground-truth location. In one example, α=0.1 is used to compare the results to conventional systems for part localization. Using the techniques disclosed herein, CNN 210 may perform part localization significantly more accurately as compared to conventional systems in all part categories except "right leg" and "left leg." Thus, the techniques of the disclosure may allow a convolutional neural network to precisely pinpoint parts of an object across a range of pose and aspect variations and occlusion for objects, such as animals, people, and vehicles.

In another example, the performance of CNN 210 was analyzed under an ablation study. Parameter λ controls the balance between part localization and classification loss during training. The influence of λ was analyzed to determine the positive influence of multi-task training on the classification task. The evolution of test loss during training for both classification and part localization was analyzed using λ={0.1, 0.2, 0.5, 1} with a small fixed learning rate over 70 epochs. Experimental analysis indicated that as λ increases, the gradient flow from the part localization sub-network overwhelms the training of the classification sub-network. In one example, the observed performance of CNN 210 was optimized using $\lambda=0.2$. However, CNN 210 may be implemented with other values for $\lambda$ not expressly described herein.

In another example, the effectiveness of the multi-task architecture of CNN 210 is analyzed. A fine-tuned VGG-16/ImageNet was used as a baseline model, which achieves a reasonable performance on both the CUB 200 2011 and Stanford Cars-196 datasets. To compare the performance before and after multitask training in accordance with the techniques described herein, the localization sub-network during training was disabled to form a classification stand-alone result. Experimental results demonstrated that CNN 210, using the techniques of the disclosure, performs better than the baseline and standalone-trained models on both datasets. Accordingly, multitask training as described herein may offer significantly improved performance in comparison to conventional systems trained to perform only a single task.

Accordingly, techniques are disclosed for identifying, using a single machine learning system, discriminative, fine-grained features of an object in an image. The compact, multi-task architecture disclosed herein simultaneously performs part localization and fine-grained classification. The techniques fuse a localization network and a classification network effectively and efficiently. Experiments demonstrate that the techniques disclosed herein may be applied to numerous types of datasets and functions generally. For example, the techniques disclosed herein are competitive on both the Stanford Cars-196 and the Cub-200-2011 birds datasets in comparison to conventional systems. Furthermore, the network set forth herein may both be significantly smaller and faster than conventional systems, and therefore may be enable real-time mobile applications for identifying discriminative, fine-grained features of an object in an image. The techniques of the disclosure may further solve multiple other problems, such as allowing the use of wearable devices to perform crowdsourced car reidentification, and further allowing the recognition of a specific instance of a vehicle by identifying unique features to the vehicle, such as a dent or scratch in a specific location on the vehicle.

Figure 5:
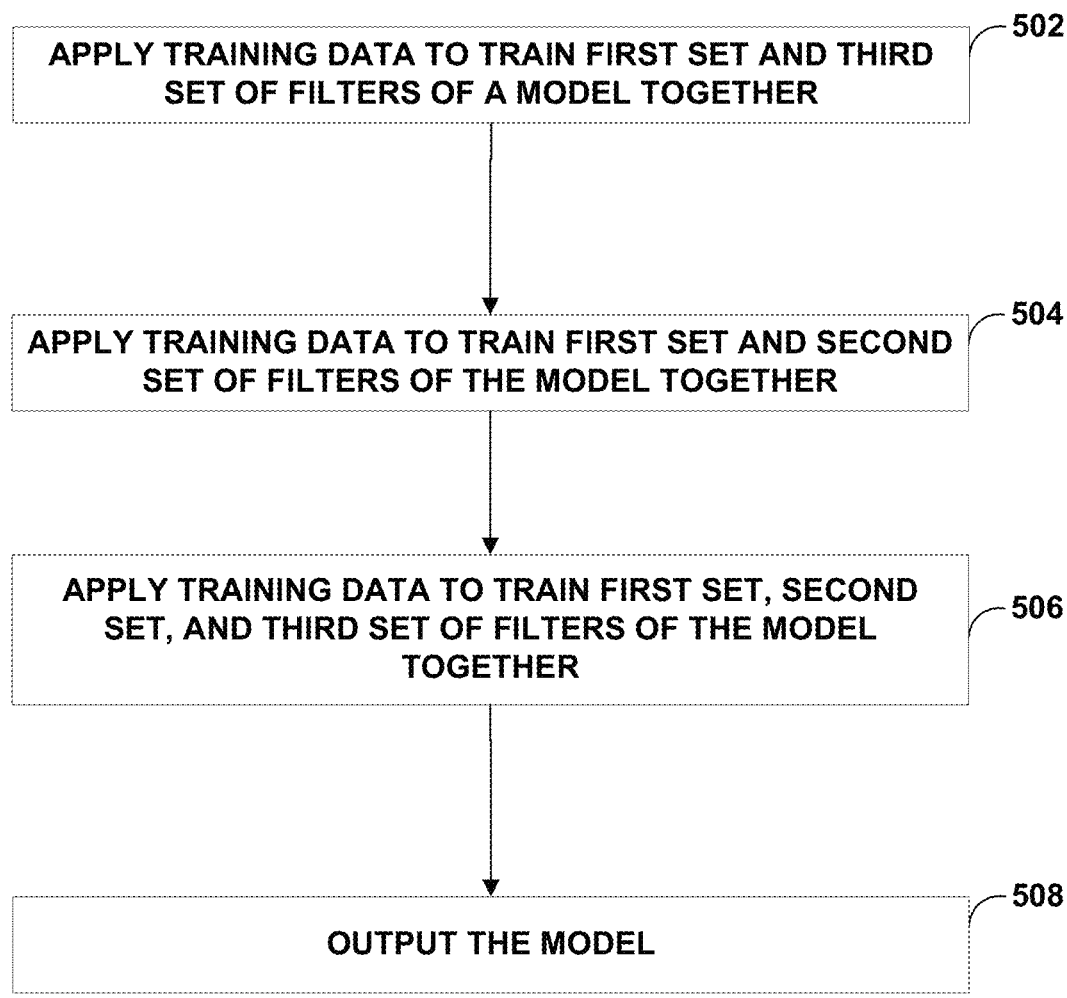
FIG. 5 is a flowchart illustrating an example operation for training the convolutional neural network model of FIG. 1.

FIG. 5 is a flowchart illustrating an example operation for training convolutional neural network model 106 of FIG. 1. For convenience, FIG. 5 is described with respect to FIG. 3.

In some examples, machine learning system 102 freezes weights of filters 120B that make up the part localization sub-network of CNN model 106. Machine learning system 102 applies training data 104 to first set of filters 120A and third set of filters 120C together to train CNN model 106 to generate classification data 114 for objects 206 in training data 104 (502).

Further, machine learning system 102 freezes weights of filters 120C that make up the classification sub-network of CNN model 106. Machine learning system 102 applies training data 104 to first set of filters 120A and second set of filters 120B together to train CNN model 106 to generate parts localization data 116 for objects 206 in training data 104 (504).

Finally, machine learning system 102 applies training data 104 to first set of filters 120A, second set of filters 120B, and third set of filters 120C together to train CNN model 106 to generate both classification data 114 and parts localization data 116 for objects 206 in training data 104 (506). Finally, machine learning system 102 may output trained CNN model 106 for use in identifying discriminative, fine-grained features of an object in an image (508).

In one example, machine learning system 102 applies training data 104 to filters 120 in a specific order to train CNN model 106. However, in other examples, machine learning system 102 applies training data 104 to filters 120 in a different order, in a random order, or only applies training data 104 to all of filters 120 simultaneously.

Figure 6:
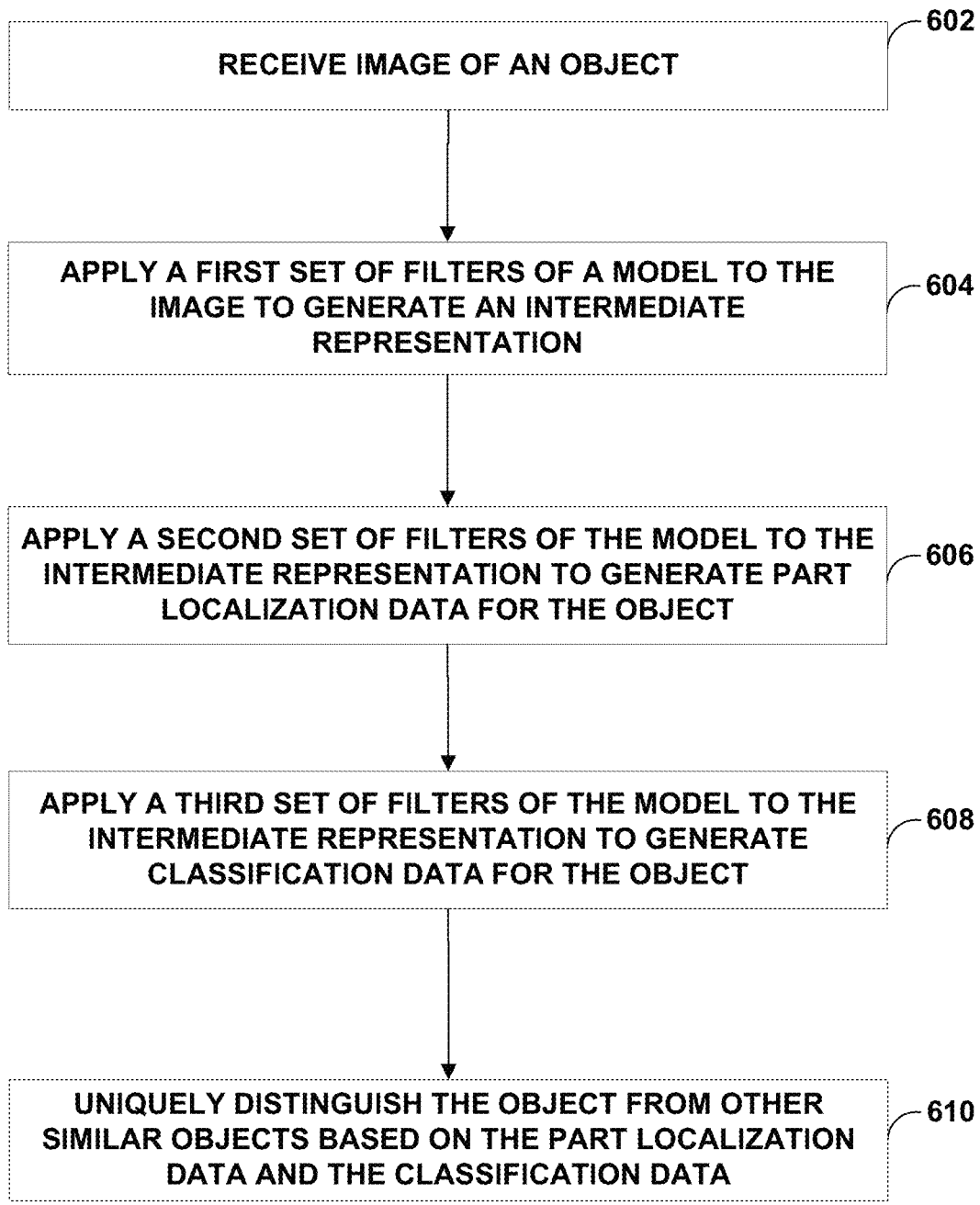
FIG. 6 is a flowchart illustrating an example operation for generating classification data and part localization data for an object depicted in an image in accordance with the techniques of the disclosure.

FIG. 6 is a flowchart illustrating an example operation for generating classification data 114 and part localization data 116 for an object depicted in image 112 in accordance with the techniques of the disclosure. For convenience, FIG. 6 is described with respect to FIG. 3.

In some examples, machine learning system 102 receives, from user interface device 108, image 112 of an object (602). In other examples, machine learning system 102 receives image 112 directly from a camera or other image capturing device. Machine learning system 102 applies first set of filters 120A to image 112 to generate an intermediate representation of image 112 suitable as an input to both second set of filters 120B third set of filters 120C of CNN model 106 (604). Machine learning system 102 applies second set of filters 120B to the intermediate representation of image 112 to generate part localization data 116 for the object (606). In some examples, part localization data 116 comprises data identifying one or more sub-parts of the object and one or more regions of image 112 in which the one or more sub-parts of the object are located. Machine learning system 102 further applies third set of filters 120C to the intermediate representation of image 112 to generate classification data 114 (608). In some examples, classification data 114 comprises data identifying a subordinate category within a basic level category to which the object belongs. In some examples, machine learning system 102 outputs, to user interface device 108 for display to the user, one or more of part localization data 116 and classification data 114.

In some examples, machine learning system 102 uses part localization data 116 and classification data 114 to uniquely distinguish the object from other similar objects in a subordinate category of similar objects so as to efficiently perform fine-grained classification of the object (610). For example, machine learning system 102 may identify a specific instance of a vehicle of a particular make and model. In another example, machine learning system 102 may identify a specific animal of a particular species.

Accordingly, system 100 may provide a multi-task, deep-learning approach to simultaneously solve part localization and fine-grained classification of an object in an image. System 100 may be capable of capturing and accounting for differences between similar looking objects within the same class to recognize specific instances of the object. Further, such a system as disclosed herein may be robust to changes caused by occlusions and overlap with surrounding objects. The network architecture and training procedure of system 100 may be less complex than conventional systems while achieving better results, significantly faster, and using a smaller memory footprint. Such a system as disclosed herein may be more efficient, faster, and use less computational resources than conventional systems that perform fine-grained classification that require multiple machine learning systems and/or models. Thus, such a system as disclosed herein may be suitable for use on resource-constrained computing systems, such as mobile devices.

Figure 7A:
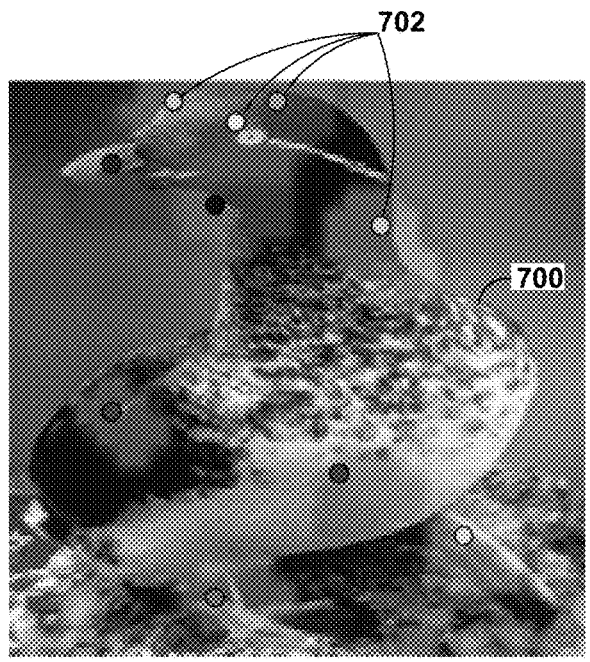
FIGS. 7A-7O are images depicting discriminative, fine-grained features of objects in accordance with the techniques of the disclosure.
Figure 7B:
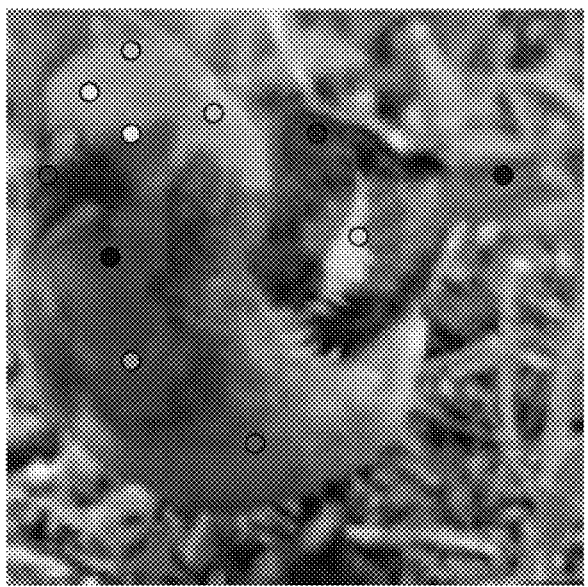
Figure 7C:
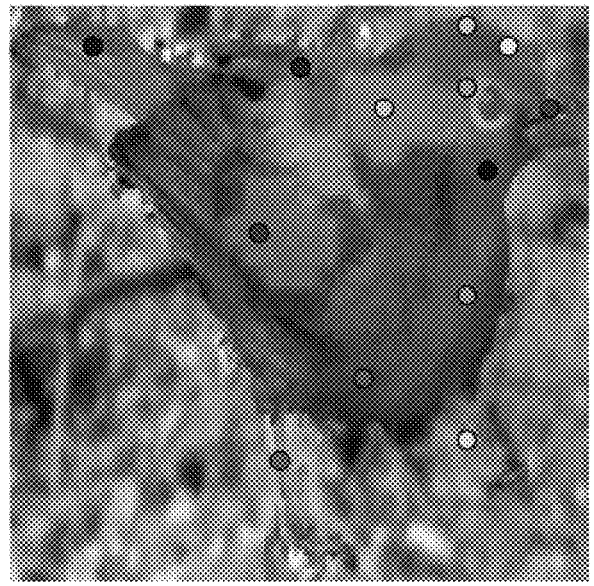
Figure 7D:
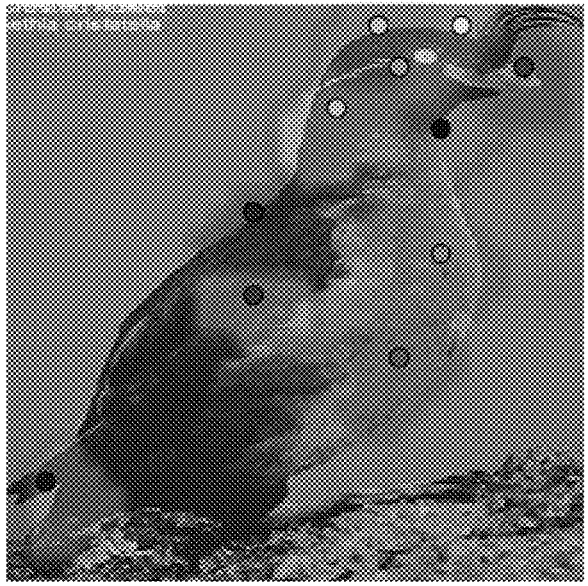
Figure 7E:
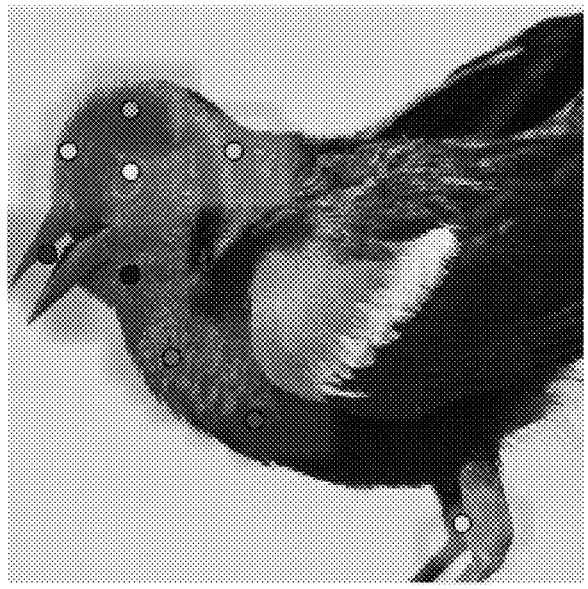
Figure 7F:
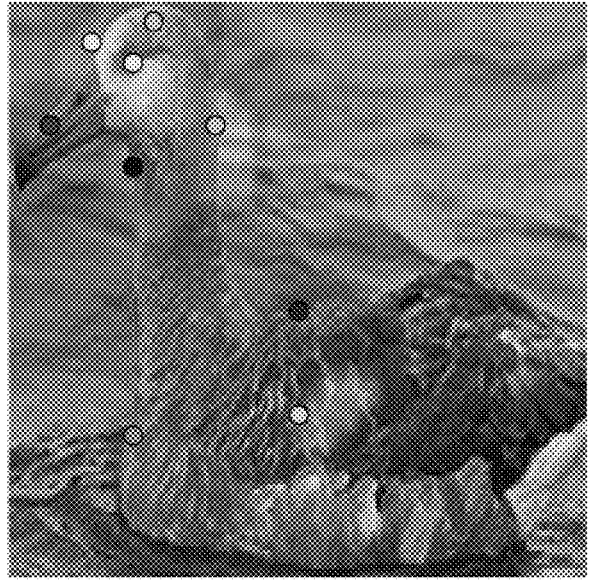
Figure 7G:
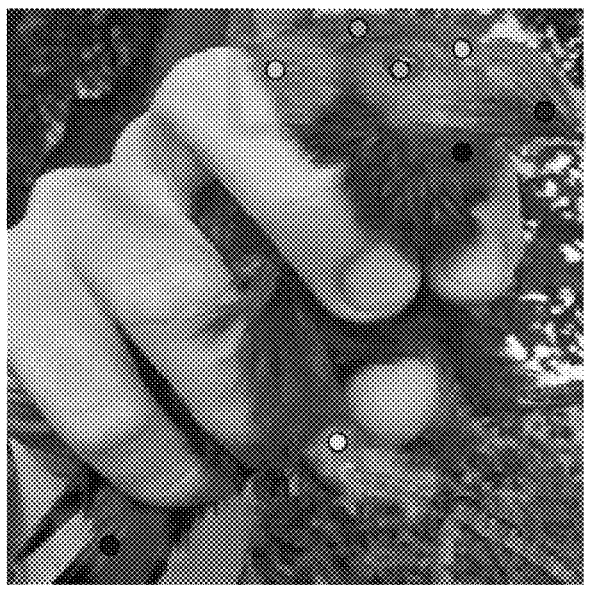
Figure 7H:
Figure 7I:
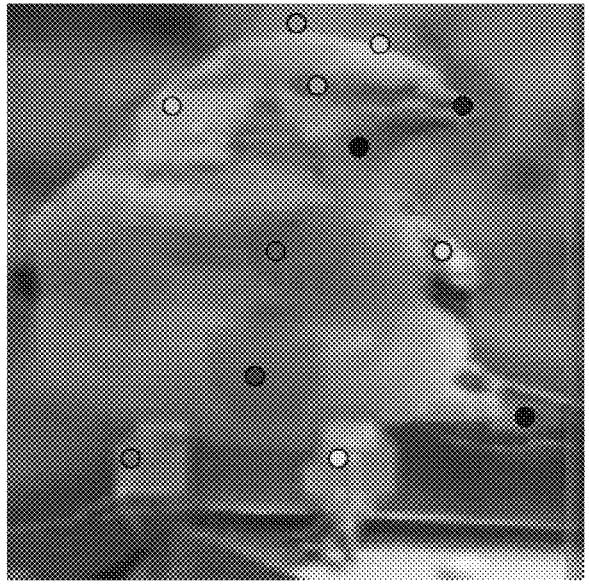
Figure 7J:
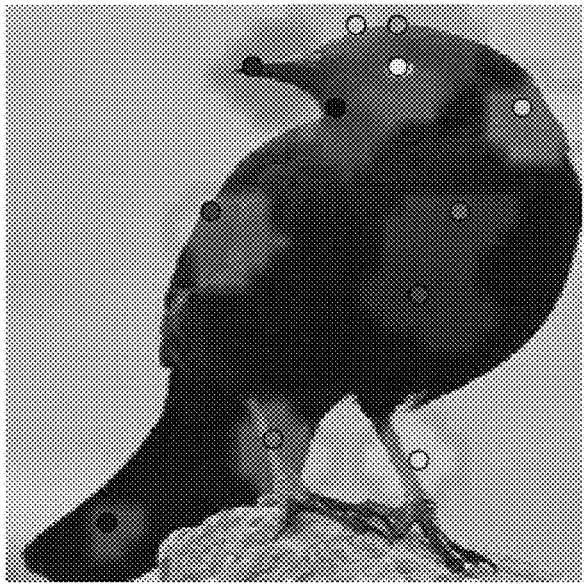
Figure 7K:
Figure 7L:
Figure 7M:
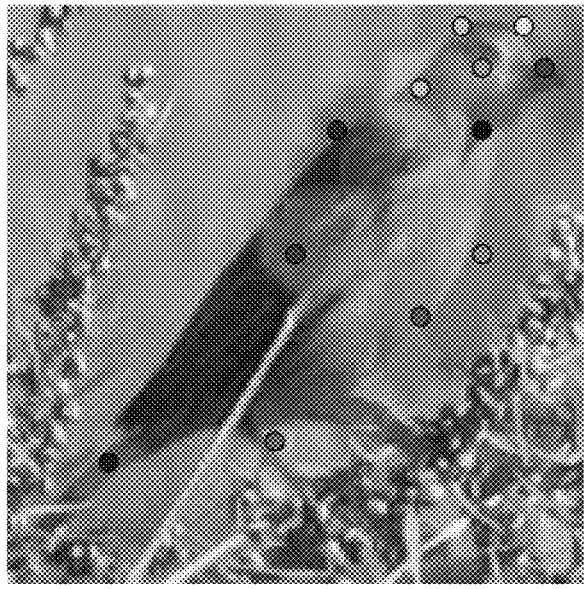
Figure 7N:
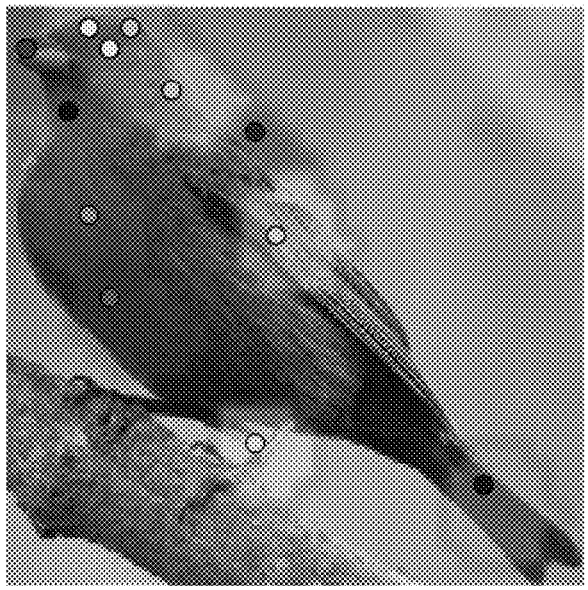
Figure 7O:
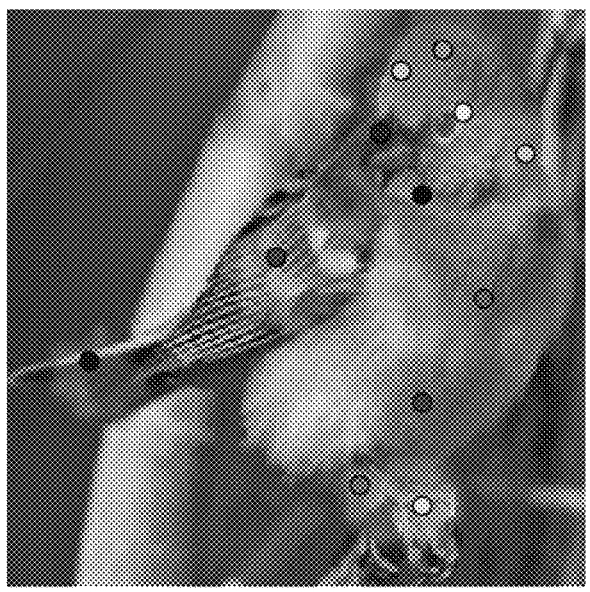

FIGS. 7A-7O are images depicting discriminative, fine-grained features of objects in accordance with the techniques of the disclosure. In some examples, each of FIGS. 7A-7O depict an example of an image 112 that is overlaid with example classification data 114 and example part localization data 116 of FIG. 1 generated in accordance with the techniques of the disclosure.

Each image of FIGS. 7A-7O depicts an object 700 and one or more regions 702 depicting sub-parts of object 700 that have been identified by machine learning system 102 of FIG. 1 using the techniques disclosed herein. For example, object 700 of FIG. 7A is a bird. Further, sub-parts 700 of FIG. 7A are one or more body-parts of bird 700 (e.g., a beak, a throat, a head, a neck, a wing, a right leg, a left leg, a breast, etc.). As described above, machine learning system 102 may process image 112 to generate classification data 114 and part localization data 116 for object 700. Machine learning system 102 may use classification data 114 and part localization data 116 to identify object 700 as a bird, and further, to identify object 700 as a particular species of bird. In some examples, machine learning system 102 may use classification data 114 and part localization data 116 to identify fine-grained features of object 700 that enables machine learning system 102 to uniquely distinguish bird 700 from other birds of the same species. FIGS. 7B-7O may depict various examples of fine-grained features of birds in a similar fashion as FIG. 7A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system for identifying discriminative, fine-grained features of an object in an image, comprising:
    an input device configured to receive the image of the object;
    a computation engine comprising processing circuitry for executing a machine learning system; and
    an output device configured to output part localization data for the object and classification data for the object,
    wherein the machine learning system comprises a model comprising a first set of filters, a second set of filters, and a third set of filters,
    wherein the machine learning system is further configured to apply the first set of filters to the received image to generate an intermediate representation of the received image suitable as an input to both the second set of filters and third set of filters,
    wherein the machine learning system is further configured to apply the second set of filters to the intermediate representation of the received image to generate the part localization data for the object, wherein the part localization data for the object comprises data identifying one or more sub-parts of the object and one or more regions of the received image in which the one or more sub-parts of the object are located, and
    wherein the machine learning system is further configured to apply the third set of filters to the intermediate representation of the received image to generate the classification data for the object,
    wherein the data identifying one or more sub-parts of the object and one or more regions of the received image in which the one or more sub-parts of the object are located along with the classification data for the object results in a more discriminative, fine-grained identification of one or more features of the object in the image.

2. The system of claim 1, wherein the classification data for the object comprises data identifying a subordinate category within a basic level category for the object.

3. The system of claim 2, wherein the machine learning system is further configured to uniquely distinguish the object from other similar objects in the subordinate category within the basic level category for the object based on the part localization data for the object and the classification data for the object.

4. The system of claim 1, wherein the machine learning system is configured to train the model by:
    applying training data comprising images of objects labeled with corresponding part localization data for the objects and corresponding classification data for the objects to train the first set of filters and the third set of filters together;
    applying the training data to train the first set of filters and the second set of filters together; and
    applying the training data to train the first set of filters, the second set of filters, and the third set of filters together.

5. The system of claim 1, wherein the machine learning system is configured to train the model by:
    applying training data comprising images of objects labeled with corresponding part localization data for the objects and corresponding classification data for the objects to train the first set of filters and the third set of filters together;

after applying the training data to train the first set of filters and the third set of filters, applying the training data to train the first set of filters and the second set of filters together; and after applying the training data to train the first set of filters and the second set of filters, applying the training data to train the first set of filters, the second set of filters, and the third set of filters together.

6. The system of claim 1, wherein the model comprises a convolutional neural network model.

7. The system of claim 1, wherein the second set of filters comprises a set of convolutional filters.

8. The system of claim 1, wherein the third set of filters comprises a set of one or more convolutional filters and one or more bilinear pooling filters.

9. The system of claim 1,
wherein the image of the object comprises an image of a vehicle,
wherein the part localization data for the object further comprises part localization data for the vehicle, the part localization data for the vehicle comprising data identifying one or more components of the vehicle and one or more regions of the received image in which the one or more components of the vehicle are located, and
wherein the classification data for the object comprises classification data for the vehicle, the classification data for the vehicle comprising data identifying a make and model of the vehicle.

10. The system of claim 9, wherein the machine learning system is further configured to uniquely distinguish the vehicle from other similar vehicles of the same make and model based on the part localization data for the vehicle and the classification data for the vehicle.

11. The system of claim 1,
wherein the image of the object comprises an image of an animal,
wherein the part localization data for the object further comprises part localization data for the animal, the part localization data for the animal comprising data identifying one or more body parts of the animal and one or more regions of the received image in which the one or more body parts of the animal are located, and
wherein the classification data for the object comprises classification data for the animal, the classification data for the animal comprising data identifying a species of the animal.

12. A method for identifying discriminative, fine-grained features of an object in an image, the method comprising:
receiving, by an input device, the image of the object;
applying, by a machine learning system executed by processing circuitry of a computation engine, a first set of filters of a model to the received image to generate an intermediate representation of the received image suitable as an input to both a second set of filters and a third set of filters of the model;
applying, by the machine learning system, the second set of filters to the intermediate representation of the received image to generate part localization data for the object, wherein the part localization data for the object comprises data identifying one or more sub-parts of the object and one or more regions of the received image in which the one or more sub-parts of the object are located;
applying, by the machine learning system, the third set of filters to the intermediate representation of the received image to generate classification data for the object; and outputting, by an output device, the part localization data for the object and the classification data for the object, wherein the data identifying one or more sub-parts of the object and one or more regions of the received image in which the one or more sub-parts of the object are located along with the classification data for the object results in a more discriminative, fine-grained identification of one or more features of the object in the image.

13. The method of claim 12, wherein the classification data for the object comprises data identifying a subordinate category within a basic level category to which the object belongs.

14. The method of claim 13, further comprising uniquely distinguishing, by the machine learning system, the object from other similar objects in the subordinate category of similar objects based on the part localization data for the object and the classification data for the object.

15. The method of claim 12, further comprising training, by the machine learning system, the model by:
applying training data comprising images of objects labeled with corresponding part localization data for the objects and corresponding classification data for the objects to train the first set of filters and the third set of filters together;
applying the training data to train the first set of filters and the second set of filters together; and
applying the training data to train the first set of filters, the second set of filters, and the third set of filters together.

16. The method of claim 12,
wherein the image of the object comprises an image of a vehicle,
wherein applying the second set of filters of the model to the intermediate representation of the received image to generate the part localization data for the object comprises applying the second set of filters of the model to the intermediate representation of the received image to generate part localization data for the vehicle, wherein the part localization data for the vehicle comprises data identifying one or more components of the vehicle and one or more regions of the received image in which the one or more components of the vehicle are located, and
wherein applying the third set of filters of the model to the intermediate representation of the received image to generate the part localization data for the object comprises applying the third set of filters of the model to the intermediate representation of the received image to generate classification data for the vehicle, wherein the classification data for the vehicle comprises data identifying a make and model of the vehicle.

17. A non-transitory computer-readable medium comprising instructions that, when executed, cause processing circuitry of a computation device to execute a machine learning system configured to identify discriminative, fine-grained features of an object in an image, wherein the machine learning system is configured to:
receive the image of the object;
apply a first set of filters of a model to the received image to generate an intermediate representation of the received image suitable as an input to both a second set of filters and a third set of filters of the model;
apply a second set of filters of the model to the intermediate representation of the received image to generate part localization data for the object, wherein the part localization data for the object comprises data identifying one or more sub-parts of the object and one or more regions of the received image in which the one or more sub-parts of the object are located;

apply a third set of filters to the intermediate representation of the received image to generate classification data for the object; and output the part localization data for the object and the classification data for the object, wherein the data identifying one or more sub-parts of the object and one or more regions of the received image in which the one or more sub-parts of the object are located along with the classification data for the object results in a more discriminative, fine-grained identification of one or more features of the object in the image.

18. A method for training a first set of filters, a second set of filters, and a third set of filters of a model of a machine learning system, executed by processing circuitry of a computation engine, to identify discriminative, fine-grained features of an object in an image, the method comprising:

applying, by the machine learning system, training data comprising images of objects labeled with corresponding part localization data for the objects and corresponding classification data for the objects to train the first set of filters and the third set of filters together to generate classification data for the objects, wherein the classification data for the objects comprises data identifying a subordinate category within a basic level category to which the objects belong, applying the training data to train the first set of filters and the second set of filters together to generate part localization data for the objects, wherein the part localization data for the objects comprises data identifying one or more sub-parts of each of the objects and one or more regions of the received image in which the one or more sub-parts of each of the objects are located;

applying the training data to train the first set of filters, the second set of filters, and the third set of filters together to generate both the part localization data for the objects and the classification data for the objects; and outputting the model.

* * * * *